(12) United States Patent
Hamamatsu et al.

(10) Patent No.: US 8,798,824 B2
(45) Date of Patent: Aug. 5, 2014

(54) SHIP MANEUVERING CONTROL METHOD AND SHIP MANEUVERING CONTROL SYSTEM

(75) Inventors: Masanori Hamamatsu, Kobe (JP); Makoto Baino, Kobe (JP); Yasuo Saito, Suita (JP); Hiroaki Mori, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 10 days.

(21) Appl. No.: 13/501,971

(22) PCT Filed: Oct. 26, 2010

(86) PCT No.: PCT/JP2010/006312
§ 371 (c)(1),
(2), (4) Date: Jun. 14, 2012

(87) PCT Pub. No.: WO2011/055512
PCT Pub. Date: May 12, 2011

(65) Prior Publication Data
US 2012/0259489 A1 Oct. 11, 2012

(30) Foreign Application Priority Data

Nov. 4, 2009 (JP) ................................. 2009-253535

(51) Int. Cl.
*G01C 21/00* (2006.01)
*G06F 7/00* (2006.01)
(52) U.S. Cl.
USPC .............................. 701/21; 701/410; 701/411
(58) Field of Classification Search
CPC .................................. G01C 21/00; G06F 7/00
USPC ........ 701/25, 415, 467, 21, 410–411; 440/86, 440/87
See application file for complete search history.

(56) References Cited

U.S. PATENT DOCUMENTS 6,085,147 A * 7/2000 Myers ........................... 701/528
6,128,571 A * 10/2000 Ito et al. ........................ 701/426
(Continued)

FOREIGN PATENT DOCUMENTS

JP  A-62-279195  12/1987
JP  A-63-108500  5/1988
(Continued)

OTHER PUBLICATIONS

International Search Report issued in Application No. PCT/JP2010/006312; Dated Feb. 15, 2011 (With Tranlsation).

*Primary Examiner* — Calvin Cheung
*Assistant Examiner* — Martin Weeks
(74) *Attorney, Agent, or Firm* — Oliff PLC

(57) ABSTRACT

A short-term planned route from a start position that is a ship position at a first time up to an end position that is the ship position at a second time is designed based on a planned route, an estimated encounter marine phenomenon information, operation performance information measured on a ship, and a hull motion model of the ship, the estimated encounter marine phenomenon information being measured on the ship based on actually encountered marine phenomenon information. The short-term planned route makes a first evaluation function optimal, the first evaluation function containing: an index indicating an influence of a fluctuation portion between a planned position that is a ship position planned at the second time on the planned route and the end position; a fuel consumption index when the ship sails along the short-term planned route; and a safety index when the ship sails along the short-term planned route.

12 Claims, 12 Drawing Sheets

(56) References Cited

U.S. PATENT DOCUMENTS

| | | |
|---|---|---|
| 2004/0006423 A1 | 1/2004 | Fujimoto et al. |
| 2004/0242091 A1* | 12/2004 | Okuyama et al. ............... 440/86 |
| 2008/0255757 A1* | 10/2008 | Bruce et al. ................... 701/202 |
| 2009/0063045 A1* | 3/2009 | Figueroa et al. ............... 701/210 |
| 2012/0046819 A1* | 2/2012 | Agrawal et al. ................. 701/25 |

FOREIGN PATENT DOCUMENTS

| | | |
|---|---|---|
| JP | A-01-187611 | 7/1989 |
| JP | A-07-242199 | 9/1995 |
| JP | A-2004-042884 | 2/2004 |
| JP | A-2007-045338 | 2/2007 |
| JP | A-2008-145312 | 6/2008 |

* cited by examiner

HULL RESISTANCE INCREASE AND DECREASE DISTRIBUTION

UPWARD AND DOWNWARD ACCELERATION DISTRIBUTION

ENCOUNTER MARINE PHENOMENON FORECAST TIME-SPACE MAP

NORTH PACIFIC OCEAN WAVE HEIGHT PREDICTION MARINE AREA SURFACE DISTRIBUTION

NORTH PACIFIC OCEAN WAVE HEIGHT DISTRIBUTION PREDICTION, 10 DAYS IN CHRONOLOGICAL ORDER

SHIP MANEUVERING CONTROL METHOD AND SHIP MANEUVERING CONTROL SYSTEM

TECHNICAL FIELD

The present invention relates to a ship maneuvering control method and ship maneuvering control system for searching an optimal route of a ship during sail to support optimal ship maneuvering control of the ship.

BACKGROUND ART

To solve problems that are a reduction in environmental load to deal with a global greenhouse gas emissions-reduction problem and an increase in fuel price, in recent years, there is a need for an improvement of energy saving of ships and their operations in shipbuilding and shipping industries. In addition, research developments regarding the maintenances and improvements of the safety of the sail of the ships and the transportation quality have been accelerated. In accordance with such a trend, the importance of an optimal seafaring technology, called weather routing, is increasing. The weather routing is a seafaring technology which predicts an encounter marine phenomenon in a marine area, in which a ship sails, based on marine phenomenon states and accumulated marine phenomenon information and proposes an optimal planned route (minimum-time route) for the purpose of minimizing the fuel consumption and securing the safety and the punctuality.

To reduce the fuel consumption of the sail of the ship, it is desirable to select a route along which the ship can sail at the lowest possible power output and to set the revolution of a main engine in that manner. However, the optimal planned route proposed by the current weather routing prioritizes the reduction in sail time, and the reduction in the fuel consumption by the reduction in the sail time is targeted. Therefore, the sail along this optimal planned route is not necessarily economical sail by which the fuel consumption is reduced. The optimal planned route proposed by the current weather routing is calculated based on meteorological and marine phenomena prediction information acquired at long-time intervals, such as at one-day intervals. To be specific, the current weather routing does not consider, for example, the meteorological and marine phenomena which change as the ship sails along the route or the meteorological and marine phenomena which have changed in a short period of time. Therefore, the optimal planned route proposed by the current weather routing is not necessarily a route in which the meteorological and marine phenomena of the current position of the ship and the current state of the ship are reflected. Due to the above reasons, in actual ship maneuvering sites, the ship leaves the optimal planned route proposed by the weather routing, and the ship maneuvering, such as a change in course or an adjustment of the ship speed, is performed based on experience and intuition of a ship pilot in accordance with actually encountered meteorological and marine phenomena. Problems of this ship maneuvering are that the ship pilot feels burdens, and determinations vary among the ship pilots.

Various proposals to conduct economically optimal sail have been made. For example, PTL 1 discloses an integrated navigation device. The integrated navigation device is configured to: calculate a most energy saving route from a departure place to a destination based on meteorological and marine phenomena data of respective marine areas and respective seasons and a current state and forecast data distributed from, for example, a communications satellite; and automatically sail along the most energy saving route by the combination of autopilot and a main engine control system.

For example, PTL 2 discloses an optimal route search method. When calculating an optimal route from a departure point to a destination in a marine area based on ship performance data specific to each ship and a forecast value of marine and meteorological phenomena data indicating long-term marine and meteorological phenomena states, the optimal route search method uses the forecast value of the marine and meteorological phenomena data, which changes temporally and spatially at the calculated position of the ship, each time a certain period of time elapses until the ship reaches the destination.

CITATION LIST

Patent Literature

PTL 1: Japanese Laid-Open Patent Application Publication No. 62-279195
PTL 2: Japanese Laid-Open Patent Application Publication No. 2008-145312

SUMMARY OF INVENTION

Technical Problem

According to the integrated navigation device described in PTL 1, the route is calculated based on meteorological phenomenon prediction data for a long period of time. Therefore, as with the above-described current weather routing, the route calculated by the integrated navigation device is not necessarily a route in which the actual meteorological and marine phenomena and the state of the ship are reflected.

According to the optimal route search method described in PTL 2, the route is calculated by utilizing marine and meteorological phenomena forecast data at a current ship position which changes in accordance with the sail of the ship. However, the optimal route search method utilizes the marine and meteorological phenomena forecast data at a current position of the ship, the marine and meteorological phenomena forecast data being estimated from the marine and meteorological phenomena data supplied at comparatively long-time intervals, such as at one-day intervals. Therefore, as with the above-described current weather routing, the route calculated by the optimal route search method is not necessarily a route in which the actual marine phenomenon and the state of the ship are reflected. The accuracy of the calculation of the optimal route improves by acquiring the marine and meteorological phenomena forecast data at shorter-time intervals. However, this is not realistic in consideration of a communication speed problem and a communication cost since the amount of communication data between the ship and a land becomes vast.

Here, in consideration of the above problems, an object of the present invention is to provide a technology of planning a practical route and a sail condition by utilizing a planned route proposed by the weather routing. More specifically, an object of the present invention is to provide a ship maneuvering control method of realizing real-time searching of an economically optimal route plan (an optimal route and an optimal ship maneuvering condition) corresponding to marine phenomena that a ship actually encounters, by utilizing a planned route proposed by the weather routing based on meteorological and marine phenomena prediction information, and a system for the ship maneuvering control method.

Solution to Problem

A ship maneuvering control method according to the present invention is a ship maneuvering control method of optimizing a route of a ship, including the steps of: acquiring estimated encounter marine phenomenon information based on actually encountered marine phenomenon information and marine phenomenon statistical information which are acquired by measuring, on the ship, marine phenomena that the ship encounters during sail, the estimated encounter marine phenomenon information being information from a first time that is a current time until a second time that is a near-future time in a route surrounding marine area; acquiring operation performance information by measuring, on the ship, an operation performance of the ship during the sail; and designing a short-term planned route which is a route from a start position that is a ship position at the first time up to an end position that is the ship position at the second time and by which a value of a first evaluation function becomes an optimal value, the short-term planned route being designed based on a planned route, the estimated encounter marine phenomenon information, the operation performance information, and a hull motion model of the ship, the planned route being designed based on meteorological and marine phenomena prediction information and the performance information of the ship such that the ship sails from a starting point up to a destination, wherein the first evaluation function contains: an index indicating an influence of a fluctuation portion between a planned position that is the ship position planned at the second time on the planned route and the end position; a fuel consumption index when the ship sails along the short-term planned route; and a safety index when the ship sails along the short-term planned route.

In the above method, the index contained in the first evaluation function and indicating the influence of the fluctuation portion between the planned position and the end position indicates the influence of the displacement of the short-term planned route from the planned route. Therefore, trade-off between a demerit of changing the planned route and a merit of sailing along the route which optimizes the fuel consumption index and the safety index based on the meteorological and marine phenomena that the ship actually encounters is realized. In addition, the optimal short-term planned route based on the actually encountered marine phenomenon is calculated in real time. Therefore, the accurate ship maneuvering control corresponding to the actually encountered marine phenomenon and the hull state, such as the draft, can be performed although it has been difficult to realize by the current weather routing. Thus, not only the reduction of the burden of the ship pilot but also the low fuel consumption and safe sail independent of the skill of the ship pilot can be realized.

The ship maneuvering control method may further include the steps of: calculating a ship maneuvering condition for sailing along the short-term planned route; and performing ship maneuvering control based on the ship maneuvering condition.

With this, the ship maneuvering condition for sailing along the short-term planned route is acquired, and the ship maneuvering may be performed in accordance with this ship maneuvering condition. Thus, not only the reduction of the burden of the ship pilot but also the low fuel consumption and safe sail independent of the skill of the ship pilot can be realized.

The ship maneuvering control method may further include the step of designing a new planned route from a new starting point that is the end position of the short-term planned route up to the destination.

With this, the ship sails while the planned route is being correcting in accordance with the actual sail. Therefore, the ship position of the ship sailing along the route which is out of the planned route does not have to be returned to the planned route which is not already optimal since the ship is out of the planned route, and the loss when returning to the planned route can be avoided.

In the ship maneuvering control method, in the step of designing the short-term planned route, a target route passing through the start position and the planned position may be set, and the short-term planned route from the first time until the second time may be searched on the basis that an end time is fixed and an end state quantity is free on the target route.

With this, the end position of the searched short-term planned route can be located out of the planned route. Therefore, in a case where the planned route is not already optimal since the start position is located out of the planned route, the ship position does not have to be returned to the planned route, so that the loss when returning to the planned route can be avoided.

In the ship maneuvering control method, it is desirable that: the planned route be designed such that a second evaluation function becomes optimal; and the index contained in the first evaluation function and indicating the influence of the fluctuation portion between the planned position and the end position indicate a fluctuation portion from the second evaluation function.

With this, by utilizing the index indicating the influence of the fluctuation portion between the planned position and the end position, the demerit of changing the planned route and the merit of sailing along the route which optimizes the fuel consumption index and the safety index based on the meteorological and marine phenomena that the ship actually encounters can be easily evaluated.

Alternatively, in the ship maneuvering control method, the index contained in the first evaluation function and indicating the influence of the fluctuation portion between the planned position and the end position may indicate a deviation between the planned position and the end position.

With this, the index indicating the influence of the fluctuation portion between the planned position and the end position can be easily calculated, and the short-term planned route can be evaluated by using this index.

In the ship maneuvering control method, it is desirable that the index contained in the first evaluation function and indicating the influence of the fluctuation portion between the planned position and the end position contain a first function and a second function, the first function being a function of a component of a deviation between the planned position and the end position in a proceeding direction of the planned route, the second function being a function of a component of the deviation in a direction perpendicular to the proceeding direction of the planned route.

Here, the first function denotes an increased portion from an evaluation index of the planned route by the change of the arrival time. The second function denotes an increased portion from the evaluation index of the planned route by the displacement of the route from the planned route. Therefore, the index contained in the evaluation function of the short-term planned route and indicating the influence of the fluctuation portion between the planned position and the end position denotes the fluctuation portion (increased portion or deteriorated portion) from the evaluation index of the planned route. Therefore, by utilizing the index indicating the influence of the fluctuation portion between the planned position and the end position, the demerit of changing the planned route and the merit of sailing along the route which optimizes the fuel consumption index and the safety index based on the meteorological and marine phenomena that the ship actually encounters can be evaluated.

In the ship maneuvering control method, weight coefficients may be respectively given to the first function and the second function, and each of these weight coefficients may be a function which changes in relation to a sail distance from the end position to the destination.

Since the remaining sail distance decreases as the end position gets close to the destination, the influence of the deviation (displacement) of the end position from the planned position increases. Therefore, by giving weight coefficients, in which the degree of the influence by the remaining sail distance is reflected, respectively to the first function and the second function, the short-term planned route can be evaluated more accurately by using the first evaluation function.

A ship maneuvering control system according to the present invention includes: a planned route designed based on meteorological and marine phenomena prediction information and performance information of a ship such that the ship sails from a starting point up to a destination; estimated encounter marine phenomenon information which is information from a first time during the sail until a second time that is a near-future time in a route surrounding marine area and is estimated based on marine phenomenon statistical information of a marine area in which the ship sails and marine phenomenon information that the ship has actually encountered; operation performance information of the ship, the operation performance information being measured until the first time during the sail; a hull motion model of the ship; and a short-term planned route designing unit configured to design a short-term planned route which is a route from a start position that is a ship position at the first time up to an end position that is the ship position at the second time and by which a value of a first evaluation function becomes an optimal value, the short-term planned route being designed based on the planned route, the estimated encounter marine phenomenon information, the operation performance information, and the hull motion model, wherein the first evaluation function contains: an index indicating an influence of a fluctuation portion between a planned position that is the ship position planned at the second time on the planned route and the end position; a fuel consumption index when the ship sails along the short-term planned route; and a safety index when the ship sails along the short-term planned route. The planned route, the estimated encounter marine phenomenon information, the operation performance information of the ship, and the hull motion model of the ship are stored in one storage unit or in a plurality of storage units, respectively.

According to the ship maneuvering control system, the index contained in the first evaluation function and indicating the influence of the fluctuation portion between the planned position and the end position indicates the influence of the displacement of the short-term planned route from the planned route. By evaluating the route by using this index, the trade-off between the demerit of changing the planned route and the merit of sailing along the route which optimizes the fuel consumption index and the safety index based on the meteorological and marine phenomena that the ship actually encounters is realized. In addition, the optimal short-term planned route based on the actually encountered marine phenomenon is calculated in real time. Therefore, the accurate ship maneuvering control corresponding to the actually encountered marine phenomenon and the hull state, such as the draft, can be performed although it has been difficult to realize by the current weather routing. Thus, not only the reduction of the burden of the ship pilot but also the low fuel consumption and safe sail independent of the skill of the ship pilot can be realized.

In the ship maneuvering control system, it is desirable that the ship maneuvering control system further include a ship maneuvering unit configured to maneuver the ship, and the short-term planned route designing unit be configured to: calculate a ship maneuvering condition used by the ship maneuvering unit to sail along the short-term planned route; and supply the ship maneuvering condition to the ship maneuvering unit.

With this, the ship maneuvering condition for sailing along the short-term planned route is acquired, and the ship maneuvering unit maneuvers the ship in accordance with this ship maneuvering condition. Thus, not only the reduction of the burden of the ship pilot but also the low fuel consumption and safe sail independent of the skill of the ship pilot can be realized.

The ship maneuvering control system may further include a planned route designing unit configured to supply the planned route to the short-term planned route designing unit, wherein the planned route designing unit may be configured to: design a new planned route from a starting point that is the end position of the short-term planned route up to the destination; and supply the new planned route to the short-term planned route designing unit.

With this, the ship sails while the planned route is being correcting in accordance with the actual sail. Therefore, the ship position of the ship sailing along the route which is out of the planned route does not have to be returned to the planned route which is not already optimal since the ship is out of the planned route, and the loss when returning to the planned route can be avoided.

In the ship maneuvering control system, the short-term planned route designing unit may set a target route passing through the start position and the planned position and search the short-term planned route, which is a route from the first time until the second time, on the basis that an end time is fixed and an end state quantity is free on the target route.

With this, the end position of the short-term planned route can be located out of the planned route. Therefore, the ship position does not have to be returned to the planned route which is not already optimal since the start position is located out of the planned route. Thus, the loss when returning to the planned route can be avoided.

In the ship maneuvering control system, it is desirable that: the planned route be designed such that a value of a second evaluation function becomes an optimal value; and the index contained in the first evaluation function and indicating the influence of the fluctuation portion between the planned position and the end position indicate a fluctuation portion from the second evaluation function.

By utilizing the index indicating the influence of the fluctuation portion between the planned position and the end position, the demerit of changing the planned route and the merit of sailing along the route which optimizes the fuel consumption index and the safety index based on the meteorological and marine phenomena that the ship actually encounters can be easily evaluated.

Alternatively, in the ship maneuvering control system, the index contained in the first evaluation function and indicating the influence of the fluctuation portion between the planned position and the end position may indicate a deviation between the planned position and the end position.

With this, the index indicating the influence of the fluctuation portion between the planned position and the end position can be easily calculated, and the short-term planned route can be evaluated by using this index.

In the ship maneuvering control system, it is desirable that the index contained in the first evaluation function and indicating the fluctuation portion of a deviation between the planned position and the end position contain a first function and a second function, the first function being a function of a component of the deviation between the planned position and the end position in a proceeding direction of the planned route, the second function being a function of a component of the deviation in a direction perpendicular to the proceeding direction of the planned route.

Here, the first function denotes an increased portion from an evaluation index of the planned route by the change of the arrival time. The second function denotes an increased portion from the evaluation index of the planned route by the displacement of the route from the planned route. Therefore, the index contained in the evaluation function of the short-term planned route and indicating the influence of the fluctuation portion between the planned position and the end position denotes the fluctuation portion (increased portion or deteriorated portion) from the evaluation index of the planned route. Therefore, by utilizing the index indicating the influence of the fluctuation portion between the planned position and the end position, the demerit of changing the planned route and the merit of sailing along the route which optimizes the fuel consumption index and the safety index based on the meteorological and marine phenomena that the ship actually encounters can be evaluated.

In the ship maneuvering control system, weight coefficients may be respectively given to the first function and the second function, and each of these weight coefficients may be a function which changes in relation to a sail distance from the end position up to the destination.

Since the remaining sail distance decreases as the end position gets close to the destination, the influence of the deviation (displacement) of the end position from the planned position increases. Here, by giving weight coefficients corresponding to the remaining sail distance from this end position up to the destination, the short-term planned route can be evaluated more accurately by using the first evaluation function.

Advantageous Effects of Invention

According to the present invention, the accurate ship maneuvering control corresponding to the actually encountered marine phenomenon and the hull state, such as the draft, can be performed although it has been difficult to realize by the current weather routing. Thus, not only the reduction of the burden of the ship pilot but also the low fuel consumption and safe sail independent of the skill of the ship pilot can be realized.

DESCRIPTION OF EMBODIMENTS

Hereinafter, an embodiment of the present invention will be explained in detail in reference to the drawings. In the following explanation and the drawings, the same reference signs are used for the same or corresponding components, and a repetition of the same explanation is avoided.

Figure 1:
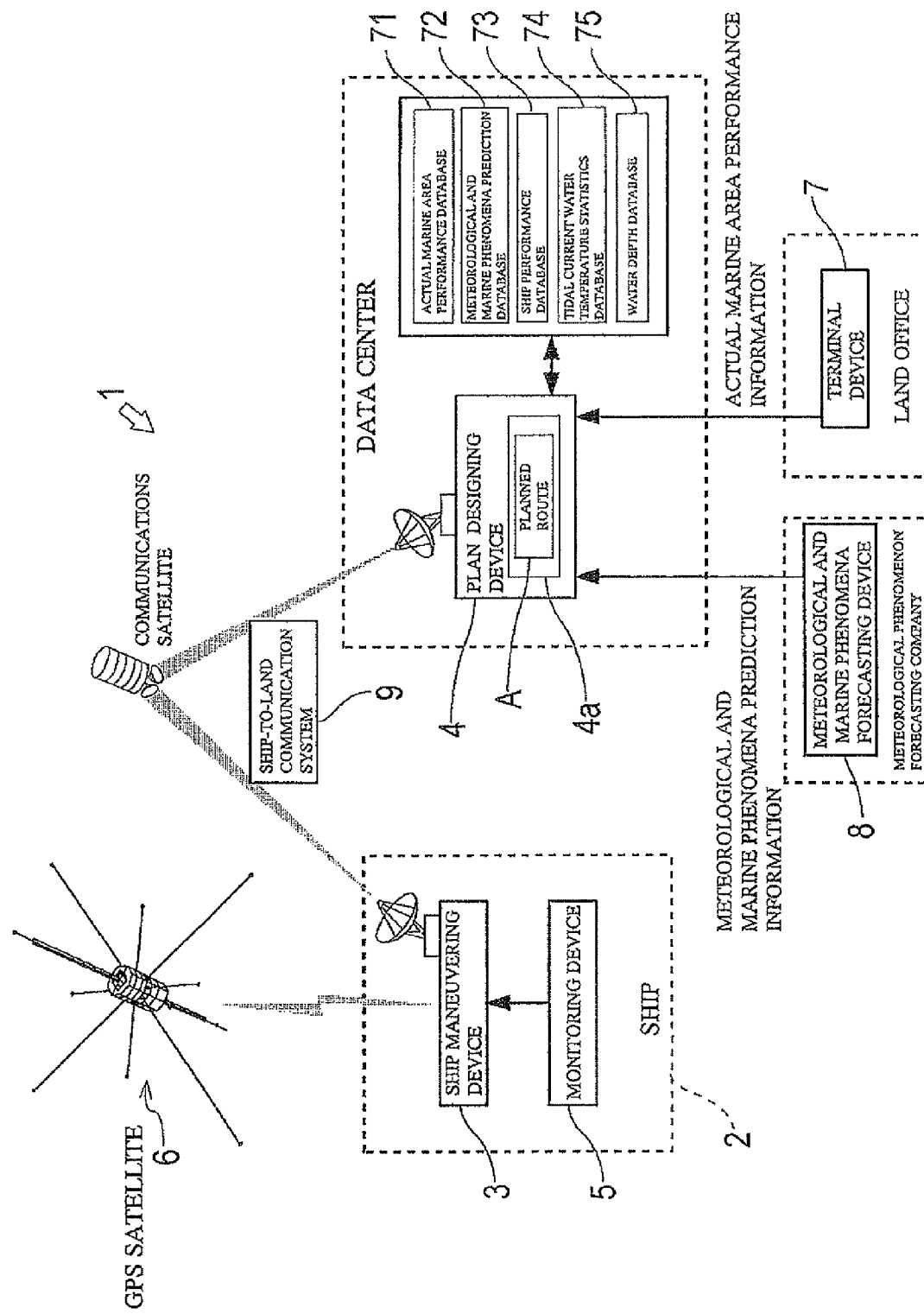
FIG. 1 is a diagram showing the configuration of an entire ship maneuvering control system according to an embodiment of the present invention.
Figure 3:
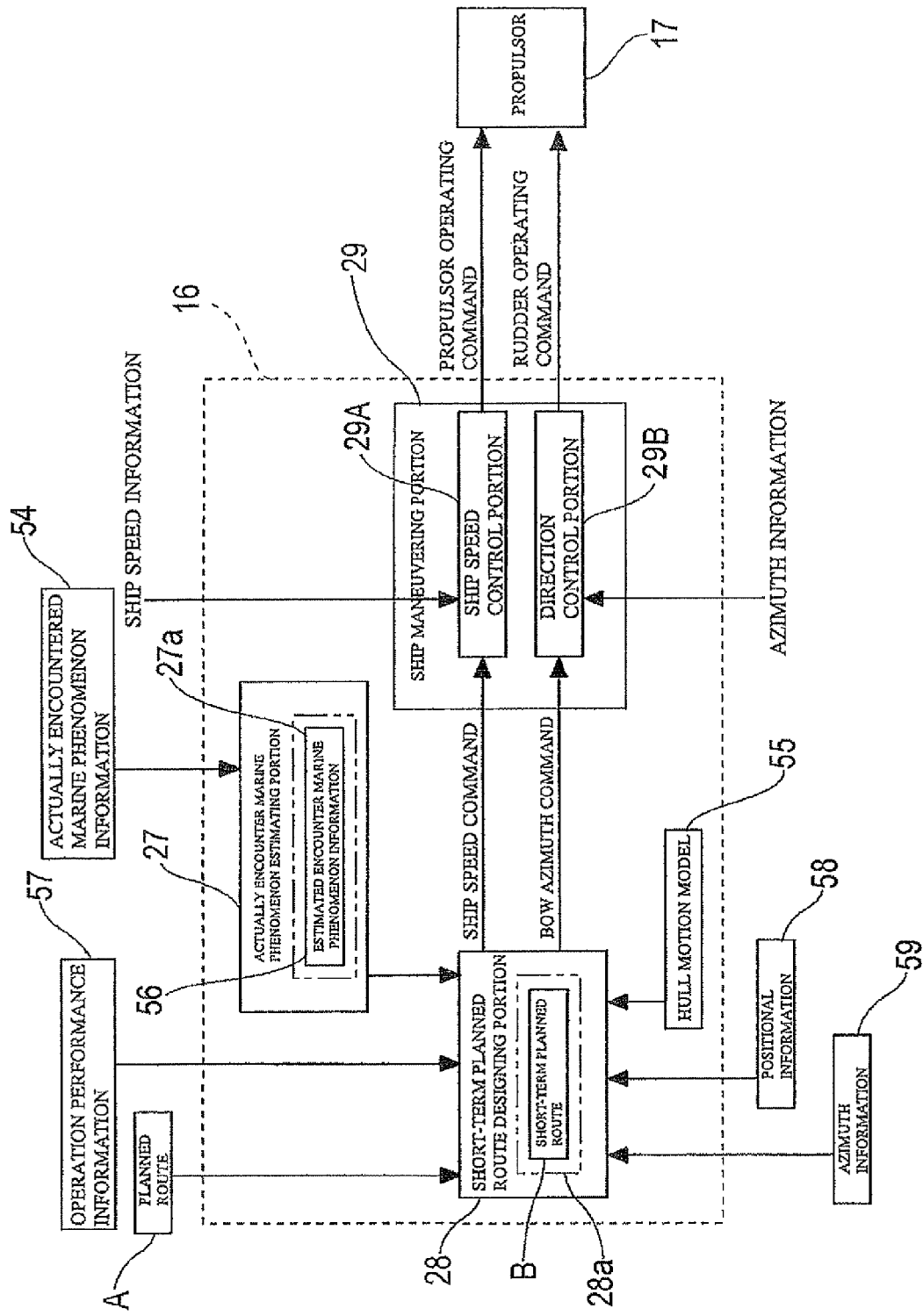
FIG. 3 is a functional block diagram of a controller.

First, a schematic configuration of a ship maneuvering control system according to the present embodiment will be explained. As shown in FIG. 1, a ship maneuvering control system 1 includes a ship maneuvering device 3, a monitoring device 5, and a planned route designing device 4. The ship maneuvering device 3 and the monitoring device 5 are mounted on a ship 2, and the planned route designing device 4 is provided on land. The planned route designing device 4 designs an optimal planned route A of the ship 2 based on a meteorological and marine phenomena forecast (a meteorological phenomenon forecast and a marine phenomenon forecast) and performance information of the ship and supplies the planned route A to the ship maneuvering device 3. As shown in FIG. 3, in order that the ship 2 sails optimally, the ship maneuvering device 3 includes a short-term planned route designing portion 28 and a ship maneuvering portion 29. The short-term planned route designing portion 28 of the ship maneuvering device 3 searches an optimal short-term planned route B (an optimal route and an optimal ship maneuvering condition) based on the planned route A, actually encountered marine phenomenon information 54 of the ship 2, operation performance information 57 of the ship 2, a hull motion model 55 of the ship 2, positional information 58 of the ship 2, and azimuth information 59 of the ship 2. The ship maneuvering portion 29 of the ship maneuvering device 3 maneuvers the ship 2 such that the ship 2 sails along the optimal short-term planned route B. The monitoring device 5 monitors the ship 2 and its sail.

Here, the "planned route A" is an optimal route which is designed (selected) by the technology of the weather routing based on the meteorological and marine phenomena prediction information and the performance information of the ship and is designed for each sail such that the ship sails from a departure point $X_0$ (departure port) to a destination $X_f$ (arrival port) in a marine area. It should be noted that during the sail of the ship 2, the planned route A may denote an optimal route from a starting point X that is a ship position at a time t to the destination $X_f$. Regarding the planned route A, the "optimal route" denotes a route which is from the starting point to the destination and by which the ship arrives at the destination at an estimated arrival time and a value of a below-described predetermined second evaluation function $J^{WR}$ becomes an optimal value. Herein, the optimal value of the second evaluation function $J^{WR}$ is a minimum value. The planned route which makes the second evaluation function $J^{WR}$ optimal is a planned route by which the ship sails from the starting point to the destination in a minimum time.

Moreover, the "short-term planned route B" denotes a route from a start position $P_t$ that is a ship position at a current time t during the sail to an end position $P_{t+T}$ that is a ship position at a time t+T, that is, a short-term planned route by which a value of a first evaluation function J becomes an optimal value. Here, the time t+T denotes a near-future time obtained by adding a time T to the time t. The time T is shorter than a time interval (generally 12 hours or 24 hours) in which the meteorological and marine phenomena forecast is distributed and is shorter than a time interval in which the planned route A is periodically supplied. Specifically, the time T is 10 to 120 minutes. Therefore, the short-term planned route B is designed based on a time unit which is adequately shorter than that of the planned route A. Hereinafter, respective devices included in the ship maneuvering control system 1 will be explained in detail.

Planned Route Designing Device 4

The planned route designing device 4 is configured by utilizing a computer which serves as the planned route designing device 4 by executing a weather routing program (optimal sail plan program). The planned route designing device 4 includes a weather routing (optimal sail plan) function and an operation performance analytical function and is configured to be able to transmit and receive information to and from the ship maneuvering device 3 through a ship-to-land communication system 9.

Figure 4:
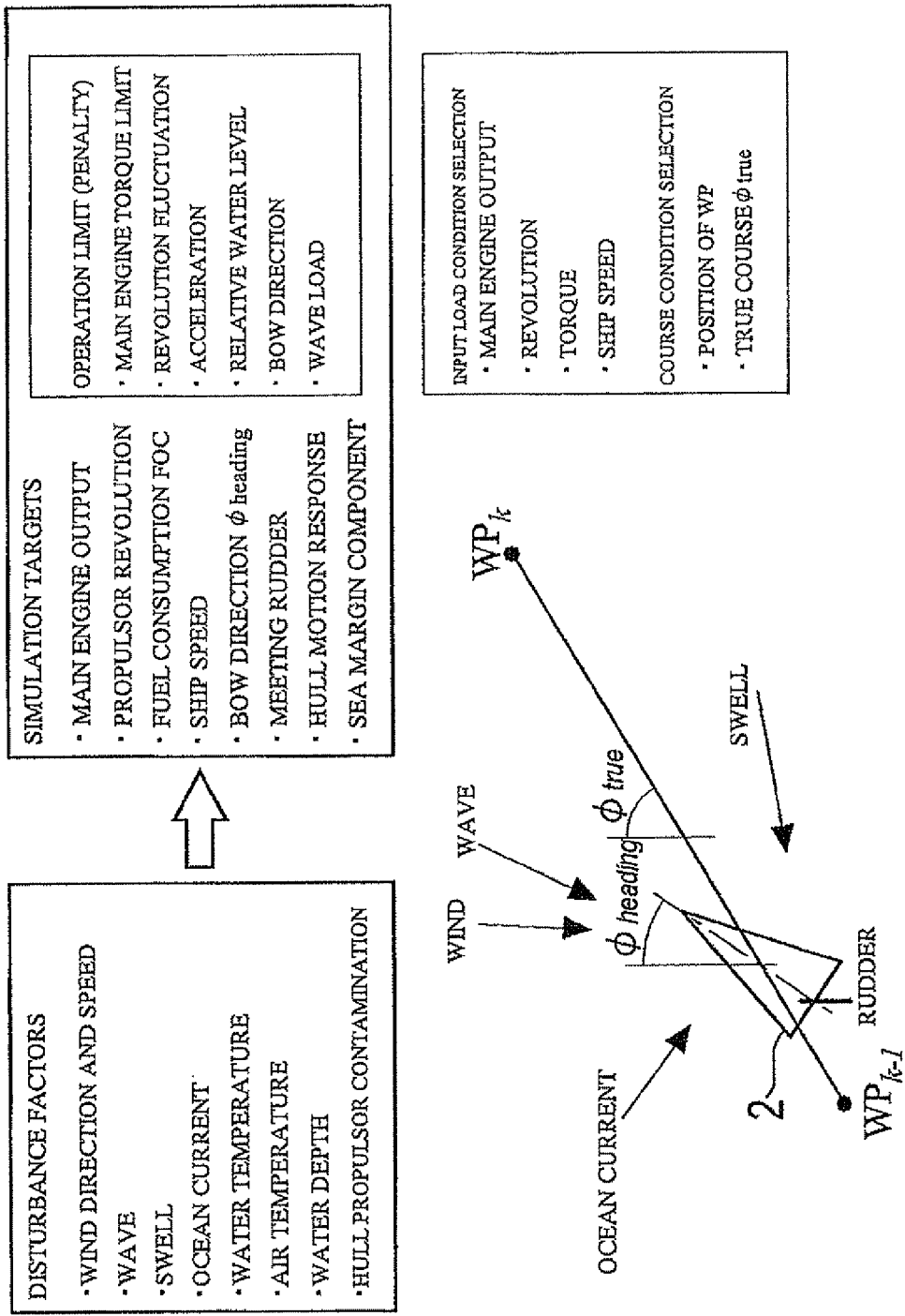
FIG. 4 is a diagram explaining an actual marine area performance simulation model.
Figure 12A:
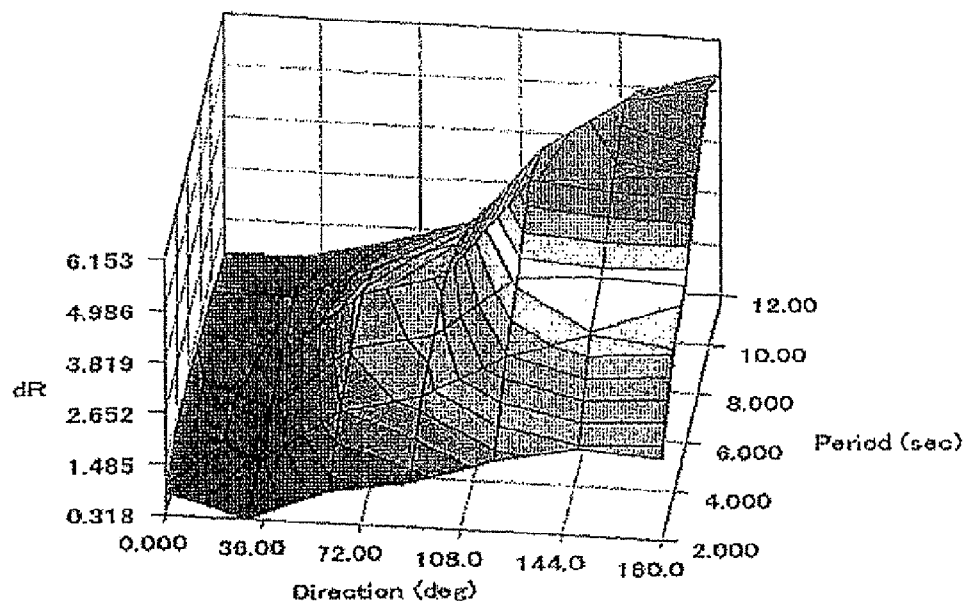
FIG. 12A is a hull resistance increase and decrease distribution map showing one example of an actual marine area performance of a ship.
Figure 12B:
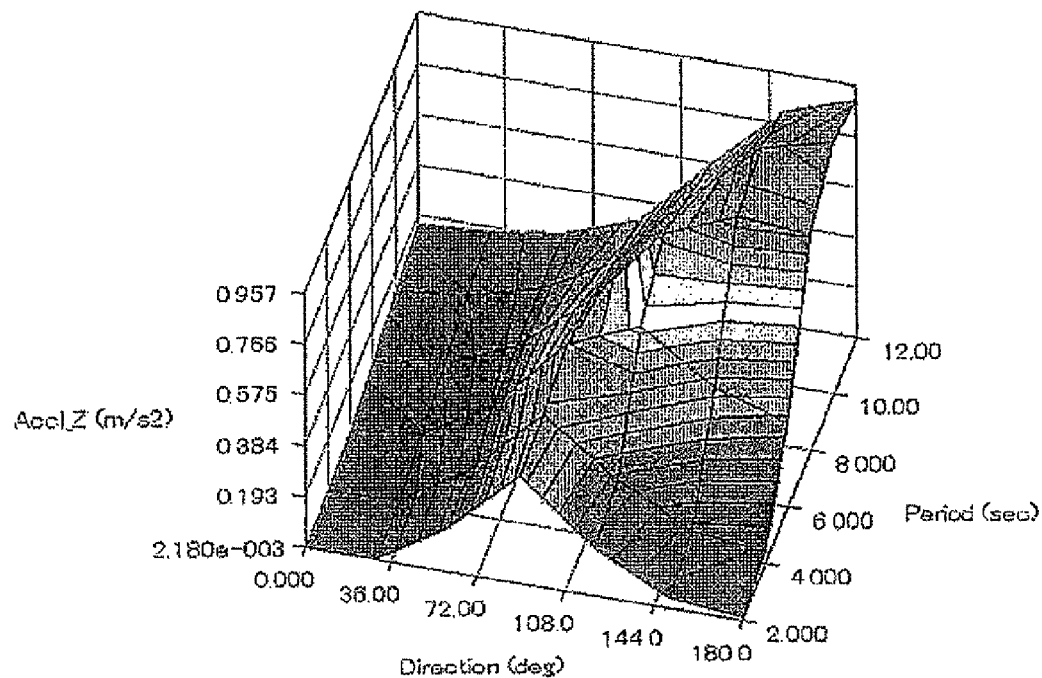
FIG. 12B is an upward and downward acceleration distribution diagram showing one example of the actual marine area performance of the ship.

The planned route designing device 4 includes an actual marine area performance database 71 configured to: receive actual marine area performance information of the ship 2 through communication means, such as Internet, from a terminal device 7 provided in a land office of, for example, a shipbuilding yard which possesses design information, such as a ship diagram; and store this actual marine area performance information. In the terminal device 7, an actual marine area performance simulation model is built, which, for example, simulates a performance response in a case where the ship moves between two way points WP in an actual marine area shown in FIG. 4. The actual marine area performance simulation model is set to take into account the performance of the ship 2 in calm water and the performance of the ship 2 influenced by disturbances, such as wind, wave, and swell, in the actual marine area. In the actual marine area performance simulation model, a hull maneuvering motion is a steady state, and a rudder angle and a transverse flow angle are set to satisfy an equilibrium condition of a hull fluid force by the transverse flow angle and a transverse force by the disturbances. In addition, in the actual marine area performance simulation model, each of an increase in power and a decrease in ship speed is set based on a resistance increase by the disturbances and the characteristics of a propulsor and a main engine. By using this actual marine area performance simulation model, the terminal device 7 calculates the actual marine area performance information, such as a short-term response surface indicating a hull resistance increase and decrease distribution (sea margin distribution) shown in FIG. 12A, a short-term response surface of a wave load distribution, and a short-term response surface indicating an upward and downward acceleration distribution shown in FIG. 12B. Each of the hull resistance increase and decrease, the wave load, and the upward and downward acceleration becomes a function of (an incident wave direction, wave frequency, wave height, ship speed, displacement, and trim).

Figure 13A:
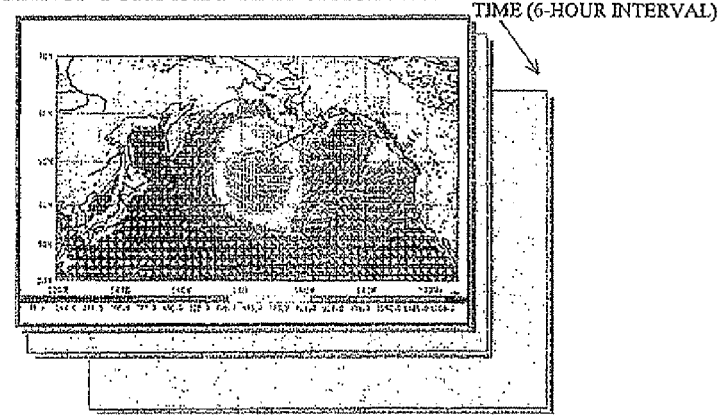
FIG. 13A is an encounter marine phenomenon forecast time-space map showing one example of marine and meteorological phenomena prediction information.
Figure 13B:
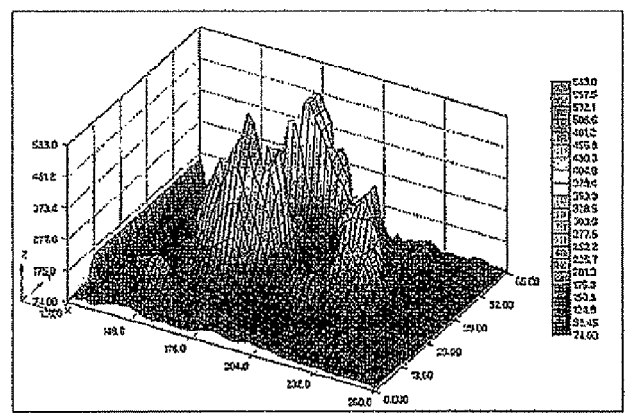
FIG. 13B is a North Pacific Ocean wave height prediction marine area surface distribution diagram showing one example of the marine and meteorological phenomena prediction information.
Figure 13C:
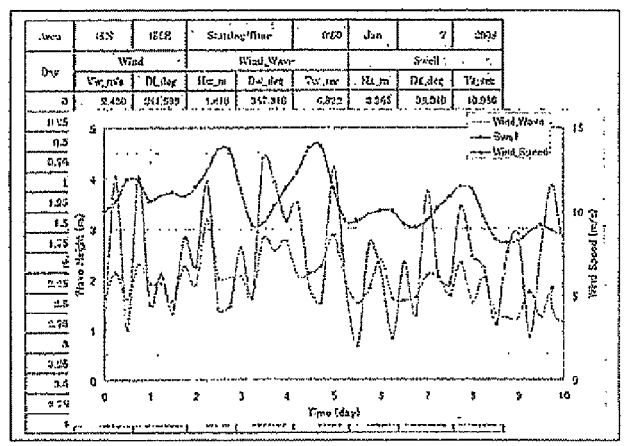
FIG. 13C is a North Pacific Ocean wave height distribution prediction time series table showing one example of the marine and meteorological phenomena prediction information.

The planned route designing device 4 includes a meteorological and marine phenomena prediction database 72 configured to: receive the meteorological and marine phenomena prediction information of the marine area in which the ship 2 sails, through communication means, such as Internet, from a meteorological and marine phenomena forecasting device 8 provided in, for example, a meteorological phenomenon forecasting company which supplies the meteorological phenomenon and marine phenomenon forecasts; and accumulate this meteorological and marine phenomena prediction information. The meteorological and marine phenomena prediction information contains the meteorological phenomenon forecast and the marine phenomenon forecast. Examples of the meteorological and marine phenomena prediction information are a marine phenomenon time-space map obtained at six-hour intervals until eight to ten days later as shown in FIG. 13A, a wave height prediction marine area surface distribution shown in FIG. 13B, and a wave height distribution prediction time series table shown in FIG. 13C. In the marine phenomenon time-space map, the marine area in which the ship 2 sails is divided by mesh. The marine phenomenon time-space map contains information, such as an ocean current, wave height, wind speed, a sea tide status, and the like of each point on the mesh.

Further, the planned route designing device 4 includes a ship performance database 73 configured to store the performance information (for example, resistance/propulsion performance information, stability performance information, seaworthy performance information, and maneuvering performance information) of respective ships to be handled. In addition, the planned route designing device 4 includes: a tidal current water temperature statistics database 74 configured to store a sail surrounding sea chart and tidal current water temperature statistical information of a sail surrounding marine area; and a water depth database 75 configured to store water depth information of the sail surrounding marine area.

According to the weather routing function of the planned route designing device 4, the optimal route (planned route A) from the departure point $X_0$ up to the destination $X_f$ is searched by utilizing the technology of the weather routing based on, for example, the actual marine area performance information of the marine area in which the ship 2 sails, meteorological and marine phenomena prediction information, and performance information of the ship 2, which are read out from respective databases, and ship positional information, performance information, and encountered marine phenomenon information which are periodically distributed from the monitoring device 5 provided on the ship, and the searched planned route A is stored in a storage unit 4a included in the planned route designing device 4. The planned route A searched as above is distributed from the planned route designing device 4 on land through the ship-to-land communication system 9 to the ship maneuvering device 3 on the ship several times a day or in accordance with a request from the ship maneuvering device 3.

Monitoring Device 5

Figure 2:
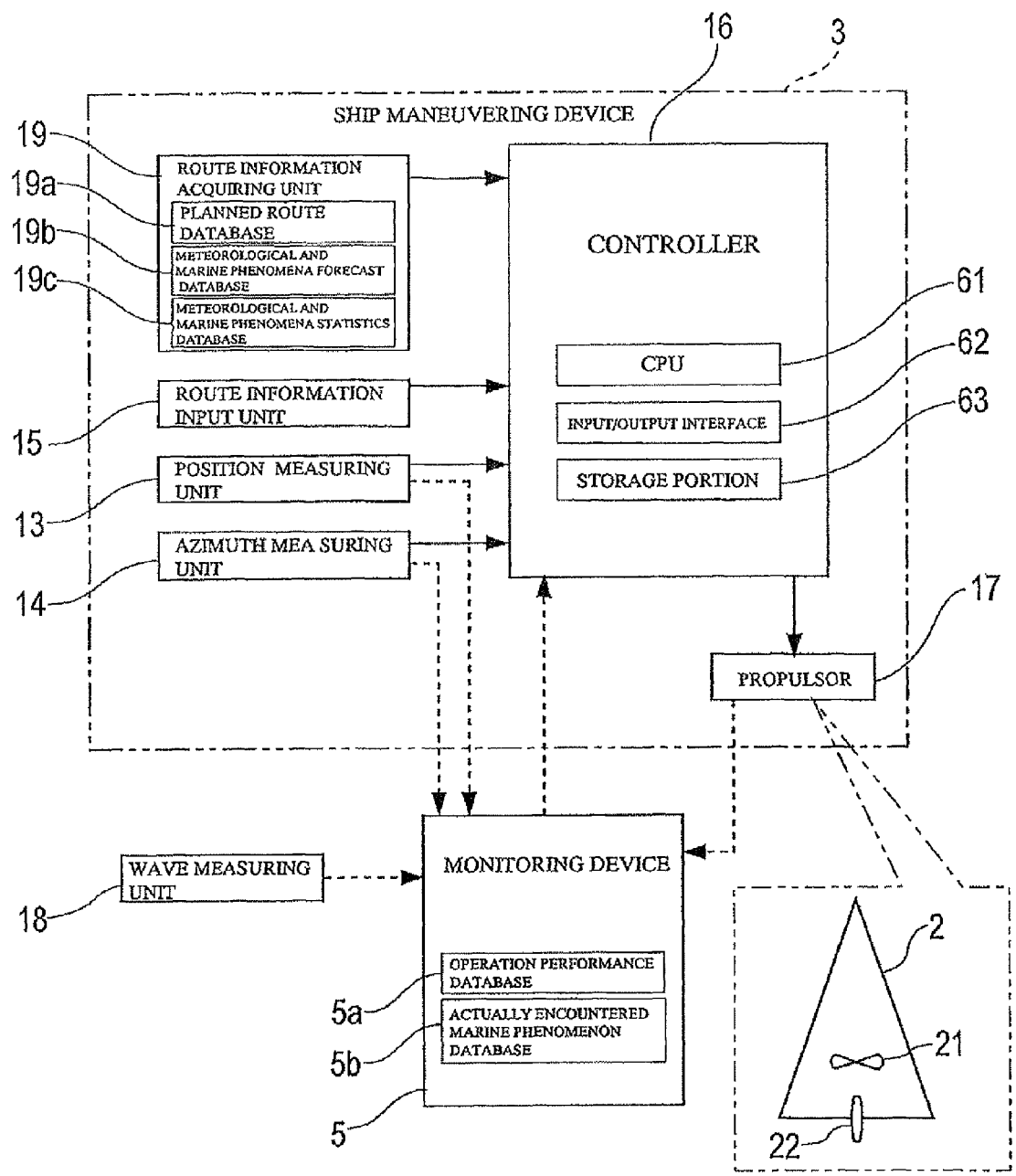
FIG. 2 is a block diagram showing the configuration of a control system of a ship maneuvering device.

The monitoring device 5 is configured by utilizing a computer which serves as the monitoring device 5 by executing a monitoring program. As shown in FIG. 2, various measuring units and meters configured to measure various numerical values indicating the operation performance of the ship 2 and the actually encountered marine phenomenon are connected to the monitoring device 5. To measure the operation performance of the ship 2 during the sail, a position measuring unit, an azimuth measuring unit, a draft measuring unit, such as a draft mark, configured to measure the draft of the ship 2, a hull attitude measuring unit configured to measure a hull attitude (trim angle), a main engine output detector configured to detect the output of the main engine, a revolution measuring unit configured to measure the revolution of a propeller shaft of a propulsor 17, a torque detector configured to detect the torque of the propeller shaft of the propulsor 17, a ship speed meter configured to measure the ship speed, and the like (all of which are not shown) are connected to the monitoring device 5. As the position measuring unit and the azimuth measuring unit, a position measuring unit 13 and an azimuth measuring unit 14 included in the ship maneuvering device 3 may serve. The actual draft, hull attitude, main engine output, revolution, torque, ship speed, azimuth, position (ship position), and the like of the ship 2 during the sail can be measured by these measuring units and meters. These respective pieces of information indicating the operation performance of the ship 2 during the sail are stored as the operation performance information in an operation performance database 5a included in the monitoring device 5. The operation performance information stored in the operation performance database 5a may be information obtained by analyzing (primary processing) various raw data pieces obtained by the monitoring device 5 from various measuring units and meters or may be both the raw data pieces and the analyzed data pieces. The operation performance information stored in the operation performance database 5a is utilized to design the short-term planned route B by the ship maneuvering device 3.

A wave measuring unit 18 including an air flow meter, a wave meter, a thermometer, and the like (all of which are not shown) to measure the encountered marine phenomenon of the ship 2 during the sail is connected to the monitoring device 5. With this, the wind speed, wave, swell, wind direction, water temperature, air temperature, and the like that the ship 2 actually encounters during the sail can be measured. The actually encountered marine phenomenon information measured during the sail of the ship 2 is stored in an actually encountered marine phenomenon database 5b included in the monitoring device 5. The actually encountered marine phenomenon information is analyzed by an actually encounter marine phenomenon estimating portion 27 of the below-described ship maneuvering device 3 and is utilized to design the short-term planned route B by the ship maneuvering device 3. Compressed data of the operation performance information and compressed data of the actually encountered marine phenomenon information are periodically, automatically distributed from the monitoring device 5 to the planned route designing device 4 on land through the ship-to-land communication system 9.

Ship Maneuvering Device 3

As shown in FIG. 2, the ship maneuvering device 3 includes the position measuring unit 13, the azimuth measuring unit 14, a route information input unit 15, a controller 16, the propulsor 17, a route information acquiring unit 19, and the like. The ship maneuvering device 3 determines a ship maneuvering condition (ship speed and bow azimuth) for causing the ship 2 to sail along the set route and controls the propulsor 17 to obtain the ship speed and bow azimuth corresponding to the ship maneuvering condition.

The position measuring unit 13 is, for example, a unit configured to measure the position of the ship 2 by utilizing the GPS (Global Positioning System) technology. The position measuring unit 13 receives a signal from a GPS satellite 6 by a GPS receiver, measure a current ship position, and output the obtained ship positional information to the controller 16. The azimuth measuring unit 14 includes, for example, a gyrocompass, measures a direction in which the bow of the ship 2 faces, and outputs the obtained azimuth information to the controller 16.

The route information input unit 15 is configured by a HMI (Human Machine Interface) constituted by a display, mouse, keyboard, and the like connected to a computer. The route information input unit 15 receives operator's external inputs of information regarding the route of the ship 2 and other information and outputs input information and stored information to the controller 16.

The route information acquiring unit 19 is a computer configured to be able to transmit and receive information to and from the planned route designing device 4 by using the ship-to-land communication system 9 utilizing a communications satellite. As storage units of information acquired from the planned route designing device 4, the route information acquiring unit 19 includes a planned route database 19a configured to store information regarding the planned route A, a meteorological and marine phenomena forecast database 19b configured to store meteorological and marine phenomena forecast information, a meteorological and marine phenomena statistics database 19c configured to store meteorological and marine phenomena statistical information, and the like. The route information acquiring unit 19 transmits to the planned route designing device 4 a route calculation execution command and a predicted ship position of the ship 2, the predicted ship position being a position of the ship after an appropriate time from the current time. In addition, the route information acquiring unit 19 receives the planned route A, the meteorological and marine phenomena forecast information, the meteorological and marine phenomena statistical information, and the like, which are distributed from the planned route designing device 4, and stores these information in respective databases. The information of the planned route A, the meteorological and marine phenomena forecast information, and the meteorological and marine phenomena statistical information stored in the databases are read out and used by the controller 16.

The propulsor 17 includes a plurality of actuators including a main propulsor 21 and a rudder 22. These actuators 21 and 22 operate in accordance with operating commands input from the controller 16. By the operations of the actuators 21 and 22, the ship 2 can move and turn in an arbitrary two-dimensional direction. The propulsor 17 is not limited to this and may be realized by actuators, the type and number of which are different from the above.

The controller 16 is configured by a computer including a CPU 61, an input/output interface 62, a storage portion 63, and the like. The storage portion 63 is constituted by a RAM, a ROM, a HDD (hard disk drive), and the like and stores computer programs and various information necessary for calculations. As shown in FIG. 3, the controller 16 can serve as the actually encounter marine phenomenon estimating portion 27, the short-term planned route designing portion 28, and the ship maneuvering portion 29 in such a manner that the CPU 61 executes a predetermined computer program stored in the storage portion 63 and performs calculations by utilizing various information input through the input/output interface 62. The ship maneuvering portion 29 includes a ship speed control portion 29A and a direction control portion 29B.

The actually encounter marine phenomenon estimating portion 27 acquires the actually encountered marine phenomenon information 54 acquired by the monitoring of the monitoring device 5 and performs time-series analysis by using the actually encountered marine phenomenon information and the meteorological and marine phenomena statistical information. Thus, the actually encounter marine phenomenon estimating portion 27 estimates the marine phenomenon that the ship 2 encounters in the route surrounding marine area from now until the near future (for example, until several hours later). This estimated marine phenomenon is hereinafter referred to as "estimated encounter marine phenomenon". This estimated encounter marine phenomenon information 56 contains measured or estimated disturbance factors (wind direction and speed, wave, swell, ocean current, water temperature, air temperature, water depth, hull propulsor contamination state, and the like) in the vicinity of the current ship position. The estimated encounter marine phenomenon information 56 generated by the actually encounter marine phenomenon estimating portion 27 as above is stored in a storage unit 27a included in the actually encounter marine phenomenon estimating portion 27. Since the estimated encounter marine phenomenon information 56 is utilized to design the short-term planned route B by the short-term planned route designing portion 28, the estimated encounter marine phenomenon information 56 may be information containing at least the estimated encounter marine phenomenon from the time t until the time t+T. As above, according to the above case of estimating (predicting) the marine phenomenon that the ship 2 will encounter in the near future, based on the actually encountered marine phenomenon information acquired in such a manner that the marine phenomenon that the ship 2 is actually encountering is observed on the ship, the information regarding the encounter marine phenomenon which is more realistic than the distributed meteorological and marine phenomena forecast can be acquired, and the short-term planned route B can be designed more accurately.

The short-term planned route designing portion 28 designs the short-term planned route B based on the route information acquired from the route information input unit 15, the planned route A acquired from the route information acquiring unit 19, the estimated encounter marine phenomenon information 56 acquired from the actually encounter marine phenomenon estimating portion 27, the operation performance information 57 of the ship 2 acquired from the monitoring device 5, the hull motion model 55 of the ship 2, the azimuth information 59 acquired from the azimuth measuring unit 14, and the positional information 58 acquired from the position measuring unit 13. The hull motion model 55 of the ship 2 is stored in the storage portion 63 included in the controller 16. The controller 16 acquires the positional information 58 from the position measuring unit 13 and the azimuth information 59 from the azimuth measuring unit 14 and may include an observer configured to output to the controller 16 a state quantity (This state quantity is an estimate value.) of the ship 2, the state quantity being based on the positional information 58 acquired from the position measuring unit 13, the azimuth information 59 acquired from the azimuth measuring unit 14, and the like.

The short-term planned route B designed by the short-term planned route designing portion 28 is stored in a storage unit 28a included in the short-term planned route designing portion 28. The designed short-term planned route B contains an optimal route and an optimal ship maneuvering condition. The ship maneuvering condition contains the ship speed (or the main engine output or the propulsor revolution) and the bow azimuth (or the rudder angle). Further, based on the optimal short-term planned route B, the short-term planned route designing portion 28 outputs a ship speed command to the ship speed control portion 29A and outputs a bow azimuth command to the direction control portion 29B.

Based on the ship speed command input from the short-term planned route designing portion 28 and ship speed information, the ship speed control portion 29A outputs a propulsor operating command to the main propulsor 21 of the propulsor 17. A known general ship speed control device may be incorporated in the controller 16 and be caused to serve as the ship speed control portion 29A. In addition, based on the bow azimuth command input from the short-term planned route designing portion 28 and azimuth information, the direction control portion 29B outputs a rudder operating command to the rudder 22 of the propulsor 17. A known general autopilot device may be incorporated in the controller 16 and be caused to serve as the direction control portion 29B.

Method of Designing Planned Route A

Next, a method of designing the planned route A by the weather routing function of the planned route designing device 4 will be explained. Hereinafter, one example of the method of designing the optimal planned route by using the weather routing technology will be explained. However, the method of designing the planned route A supplied by the planned route designing device 4 is not limited to this.

In the planned route designing device 4, a simulation model which performs the weather routing for the route designing is being built. In this simulation model of the weather routing, not only the minimization of the fuel consumption but also limiting conditions, such as a main engine output limitation and an operation limit which considers a safe operation, are being included, and not only a natural reduction in the ship speed but also an intentional speed reduction for, for example, avoiding heavy weather are being modeled and incorporated. In the actual route designing, a plurality of routes from the departure point $X_0$ up to the destination $X_f$ (the position of the arrival port) are being proposed, and the optimal route is selected from the plurality of routes by simulations. The designed "optimal" planned route A makes the second evaluation function $J^{WR}$ represented by Formula 1 below minimum. Since the motion, acceleration, main engine load, and the like of the ship 2 have operation limits, the second evaluation function $J^{WR}$ contains a penalty function by the operation limits.

$$J^{WR} = \int_{T_0}^{T_f} \left\{ FOC(V_s, \varphi_s) + \sum w_k \cdot P(x_k) \right\} \cdot dt \qquad \text{Formula 1}$$

In Formula 1, a fuel consumption FOC is represented by a function using as control variables a ship speed $V_s$ and bow azimuth $\varphi_s$ under the encountered marine phenomenon condition, $x_i$ denotes a short-term response corresponding to the operation limit of the acceleration or the like, $P(x_i)$ denotes a penalty function with respect to the response, $w_i$ denotes a weight coefficient, $T_0$ denotes a departure time, and $T_f$ denotes an arrival time. Further, the condition of Formula 2 below is given to Formula 1 as a terminal end restraint condition. In Formula 2, X denotes the ship position at the time t, $X_f$ denotes the destination, and $T_f$ denotes the arrival time.

$$X(T_f) - X_f = 0 \qquad \text{Formula 2}$$

The main engine output limitation added to Formula 1 is represented by Formula 3 below. In Formula 3, a main engine output limitation $BHP_{LIMIT}$ is represented as a function of a revolution RPM. In order that an output BHP at a certain time becomes equal to or lower than the main engine output limitation $BHP_{LIMIT}$, the revolution RPM is reduced to a revolution RPM corresponding to the main engine output limitation $BHP_{LIMIT}$ or lower, so that the speed is reduced.

$$BHP[RPM(V_s)] \leq BHP_{LIMIT}(RPM) \qquad \text{Formula 3}$$

In the actual simulation, DP (dynamic programming) is adopted as an optimizing method of increasing the speed of calculations from the viewpoint of practical use, and a minimum-time route search method at a constant output which is limited by the main engine output limitation may be adopted. In this case, based on the principle of the optimal method, a backward-type function recurrence equation may be utilized, which searches an optimal solution in a reverse direction using the way point WP, obtained by dividing the route marine area, as a node and using the destination $X_f$ as the starting point. The backward-type function recurrence equation is represented by Formula 4 below.

$$f_i = \min[g_i + f_{i-1}] \qquad \text{Formula 4}$$

In Formula 4, $f_i$ denotes a minimum value of the second evaluation function $J^{WR}$ up to an i-th way point $WP_i$. In addition, $g_i$ denotes an evaluation function from an (i−1)-th way point $WP_{i-1}$ to the i-th way point $WP_i$ and is represented by Formula 5 below. In Formula 5, $l_i$ denotes a distance between the (i−1)-th way point $WP_{i-1}$ and the i-th way point $WP_i$, and $V_{Si}$ denotes the ship speed between these way points and denotes a value determined based on the encounter marine phenomenon and the main engine output limitation. Further, $P(x_k)$ denotes a penalty function with respect to the response, and $w_k$ denotes a weight coefficient.

$$g_i = \frac{l_i}{V_{Si}} + \sum w_k \cdot P(x_k) \qquad \text{Formula 5}$$

Moreover, an optimal ship speed distribution corresponding to the optimal route obtained by the weather routing is calculated by using Formula 4 and Formula 6 instead of Formula 5 in the same manner as the method of calculating the above optimal route. It should be noted that a punctuality condition represented by Formula 7 is added. In Formula 6, a fuel consumption $FOC_i$ is represented by a function using as a control variable a ship speed $V_{si}$ under the encountered marine phenomenon condition, $x_i$ denotes a short-term response corresponding to the operation limit of the acceleration or the like, $P(x_i)$ denotes a penalty function with respect to the response, and $w_i$ denotes a weight coefficient. In Formula 7, $T_0$ denotes a departure time, $T_f$ denotes an arrival time, and $l_i$ denotes a distance between the (i−1)-th way point $WP_{i-1}$ and the i-th way point $WP_i$.

$$g_i = FOC_i(V_{Si}) + \sum w_k \cdot P(x_k) \qquad \text{Formula 6}$$

$$\sum \frac{l_i}{V_{Si}} = T_f - T_0 \qquad \text{Formula 7}$$

Optimal Ship Maneuvering Control Method and Method of Designing Short-Term Planned Route B Here, the optimal ship maneuvering control method by the ship maneuvering control system 1 configured as above will be explained. As described above, the actually encounter marine phenomenon estimating portion 27 of the ship maneuvering device 3 estimates the encounter marine phenomenon, which occurs in the route surrounding marine area from now until the near future, based on the actually encountered marine phenomenon monitored by the monitoring device 5. However, the estimated encounter marine phenomenon and the meteorological and marine phenomena forecast distributed from the planned route designing device 4 do not necessarily coincide with each other. This is because the meteorological and marine phenomena forecast is distributed, for example, once or twice a day, and the status of the sea may rapidly change or the ship 2 may sail out of the planned route A between the distributions. Therefore, the planned route A designed based on the meteorological and marine phenomena forecast does not necessarily indicate the optimal route.

Here, to sail more optimally, the ship maneuvering device 3 performs the ship maneuvering control by using both the estimated encounter marine phenomenon closer to the marine phenomenon that the ship 2 actually encounters and the planned route A generated by the weather routing. Therefore, the short-term planned route designing portion 28 of the ship maneuvering device 3 designs the short-term planned route B by simulations based on the estimated encounter marine phenomenon information 56, the operation performance information 57, the hull motion model 55 of the ship, and the planned route A, the estimated encounter marine phenomenon information 56 being based on the actually encountered marine phenomenon of the ship 2. The short-term planned route B contains the optimal route until the time T later from the current time t and the optimal ship maneuvering condition when sailing along the optimal route. Based on the ship maneuvering condition contained in the short-term planned route B, the short-term planned route designing portion 28 outputs the ship speed command to the ship speed control portion 29A and outputs the bow azimuth command to the direction control portion 29B.

Figure 5:
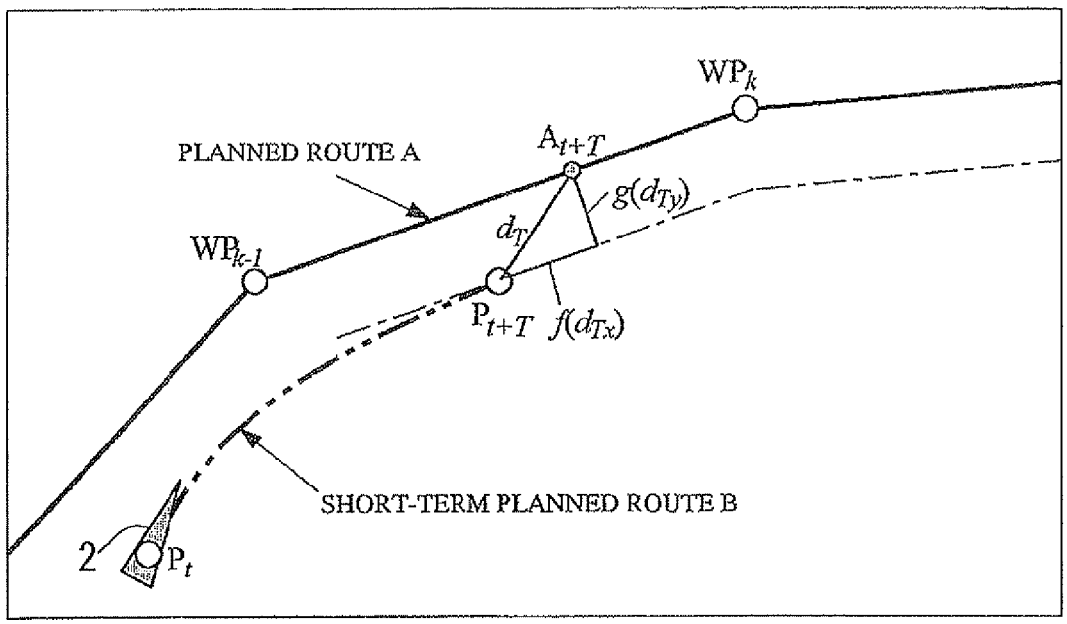
FIG. 5 is a diagram explaining a method of designing a short-term planned route.

As shown in FIG. 5, the short-term planned route designing portion 28 sets the ship position at the current time t as the start position $P_t$ and sets as the target position the position (planned position $A_{t+T}$) of the ship on the planned route A at the time t+T obtained by adding the time T to the current time t. Then, the short-term planned route designing portion 28 simulates and predicts the behavior of the ship 2 until the time T later from the current time t to search the short-term route on the basis that an end time is fixed, and an end position (state quantity) is free. In this simulation, calculations are performed by using the preset hull motion model based on, for example, RH (Receding Horizon). The RH is a control system design method of predicting a finite time future at each sample time and optimizing the response. Here, the end position $P_{t+T}$ (that is, the ship position at the time t+T) of the searched short-term route (the short-term planned route B) is not limited to the planned route A and is allowed to be displaced from the planned position $A_{t+T}$. As above, since the short-term planned route B has freedom to be changed from the planned route A, the end position $P_{t+T}$ of the short-term planned route B may be displaced from the planned route A.

Therefore, for example, in a case where the route is not already optimal since the start position $P_t$ has been displaced from the planned route A, the position of the ship 2 does not have to be returned to the planned route A, and the loss when returning to the planned route A can be avoided.

Among the short-term routes searched as above, the short-term planned route designing portion 28 sets as the optimal short-term planned route B a route by which the first evaluation function J represented by Formula 8 becomes minimum. The first evaluation function J is constituted by a first element $J_1$ and a second element $J_2$. The first element $J_1$ of the first evaluation function J contains a fuel consumption index and a safety index (operation limit), such as the magnitude of hull shaking, when the ship 2 sails along the route from the start position $P_t$ to the end position $P_{t+T}$. The second element $J_2$ of the first evaluation function J contains an index indicating the influence of a deviation between the planned position $A_{t+T}$ and the end position $P_{t+T}$.

$$J = J_1 + J_2 \qquad \text{Formula 8}$$
$$= \int_t^{t+T} F_1 \cdot dt + F_2$$

In Formula 8, a function $F_1$ indicating the first element $J_1$ can be calculated in the same manner as the second evaluation function $J^{WR}$. To be specific, the first element $J_1$ of the first evaluation function J can be calculated from, for example, the hull resistance increase and decrease distribution (sea margin distribution) and wave load distribution determined based on the disturbance condition. As one example, the first element $J_1$ of the first evaluation index J may be set to a weighted average of the fuel consumption and the hull shaking when the ship sails from the start position $P_t$ up to the end position $P_{t+T}$.

Meanwhile, the second element $J_2$ of the first evaluation function J indicates a fluctuation portion from the second evaluation function $J^{WR}$. To be specific, the second element $J_2$ of the evaluation function J indicates the influence (loss) of the displacement from the planned route A to the short-term planned route B (or the displacement from the planned position $A_{t+T}$ to the end position $P_{t+T}$ or the change of a planned position arrival time). A function $F_2$ indicating the second element $J_2$ of the first evaluation function J contains as a parameter the deviation between the planned position $A_{t+T}$ of the ship 2 on the planned route A at the time t+T and the end position $P_{t+T}$ and is a penalty function imposed on the deviation. Since the second element $J_2$ is contained in the first evaluation function J, trade-off between a demerit of changing the planned route A and a merit of sailing along the route which optimizes the fuel consumption index and the safety index based on the meteorological and marine phenomena that the ship 2 actually encounters is realized. Further, to facilitate this trade-off, a weight corresponding to the magnitude of the value of the second element $J_2$ may be given to the second element $J_2$, and the magnitude of the value of the second element $J_2$ may be contained in the evaluation of the first evaluation function J.

As shown in FIG. 5, a displacement dT from the planned position $A_{t+T}$ on the planned route A to the end position $P_{t+T}$ is represented by a component $d_{Tx}$ in a proceeding direction of the planned route A and a component $d_{Ty}$ in a direction perpendicular to the proceeding direction of the planned route A. As shown in Formula 9, the function $F_2$ is a function of the component $d_{Tx}$ and the component $d_{Ty}$. The function $F_2$ is represented as a sum of a function $m(d_{Tx})$ of the component $d_{Tx}$ and a function $n(d_{Ty})$ of the component $d_{Ty}$. The function $m(d_{Tx})$ of the component $d_{Tx}$ denotes an increased portion from the second evaluation index $J^{WR}$ of the planned route A by the change of the arrival time. The function $n(d_{Ty})$ of the component $d_{Ty}$ denotes an increased portion of the second evaluation index $J^{WR}$ by the displacement of the route. As above, the second element $J_2$ of the first evaluation function J denotes the fluctuation portion (increased portion or deteriorated portion) from the second evaluation index $J^{WR}$.

$$F_2 = m(d_{Tx}) + n(d_{Ty}) \qquad \text{Formula 9}$$

The second component $J_2$ of the first evaluation function J can be calculated from various viewpoints. Here, regarding Formula 9, examples of the function $F_2$ indicating the second component $J_2$ are shown as ex.1 in Formula 9-1, ex.2 in Formula 9-2, and ex.3 in Formula 9-3.

Formula 9-1

$$F_2 = w_x \cdot d_{Tx}^2 + w_y \cdot d_{Ty}^2 \qquad (\text{ex.1})$$

In ex.1 in Formula 9-1, the function $F_2$ is represented as a sum of a product of a weight coefficient $w_x$ and a square of the component $d_{Tx}$ and a product of a weight coefficient $w_y$ and a square of the component $d_{Ty}$.

Formula 9-2

$$F_2 = w_x \cdot d_{Tx} |d_{Tx}| + w_y \cdot d_{Ty}^2 \qquad (\text{ex.2})$$

In ex.2 in Formula 9-2, the function $F_2$ is represented as a sum of a product of the weight coefficient $w_x$, the component $d_{Tx}$, and its absolute value $|d_{Tx}|$ and a product of the weight coefficient $w_y$ and the square of the component $d_{Ty}$.

$$(\text{ex. 3}) \quad F_2 = (J^{WR'} - J^{WR})\left(w_x \left|\frac{d_x'}{d'} d_{Tx}\right| + w_y \left|\frac{d_y'}{d'} d_{Ty}\right|\right) \qquad \text{Formula 9-3}$$

Figure 6:
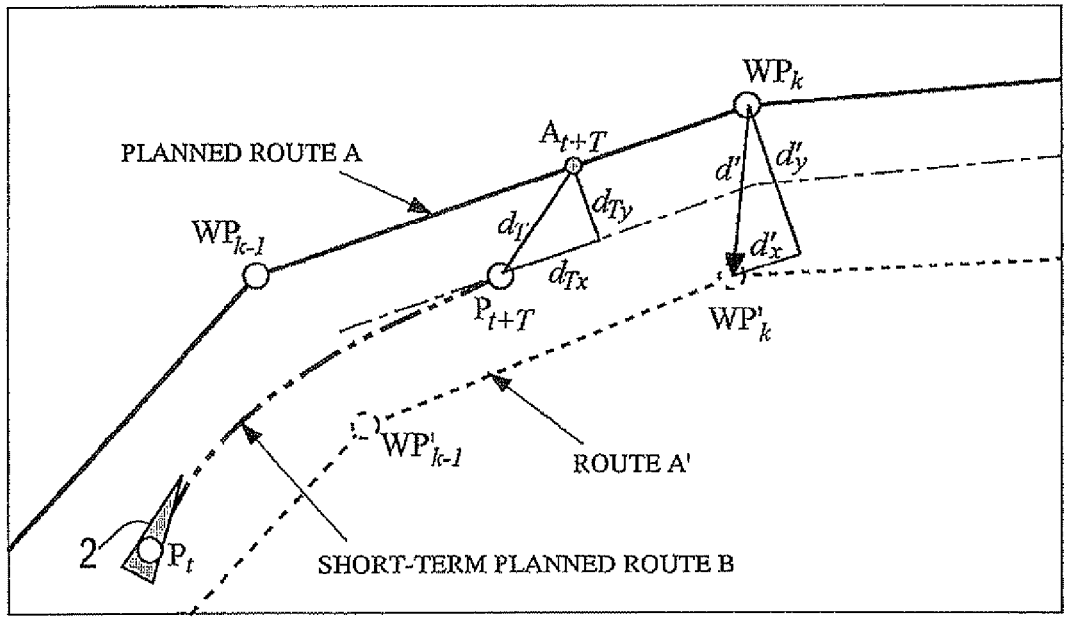
FIG. 6 is a diagram which relates to the method of designing the short-term planned route and explains a method (first method) of calculating a second element of an evaluation function by utilizing ex.3 in Formula 9-3.

As shown in FIG. 6, when searching the planned route A, a second evaluation index $J^{WR'}$ of a route A' located on the same side as the end position $P_{t+T}$ when viewed from the planned route A and extending in the vicinity of the planned route A is being studied. The second component $J_2$ can be calculated in accordance with ex.3 in Formula 9-3 in a case where a displacement d' from the way point WP on the planned route A up to a way point WP' on the route A', a component $d_x'$ of the displacement d' in the direction of the planned route A, and a component $d_y'$ of the displacement d' in a direction perpendicular to the direction of the planned route A are being known. In ex.3, the function $F_2$ is represented as a product of {a difference between the second evaluation index $J^{WR'}$ of the route A' and the second evaluation index $J^{WR}$ of the planned route A} and {a sum of: a value obtained by multiplying the weight coefficient $w_x$ by an absolute value of a product of the component $d_{Tx}$ and a quotient obtained by dividing the component $d_x'$ by the displacement d'; and a value obtained by multiplying the weight coefficient $w_y$ by an absolute value of a product of the component $d_{Ty}$ and a quotient obtained by dividing the component $d_y'$ by the displacement d'}.

Figure 7:
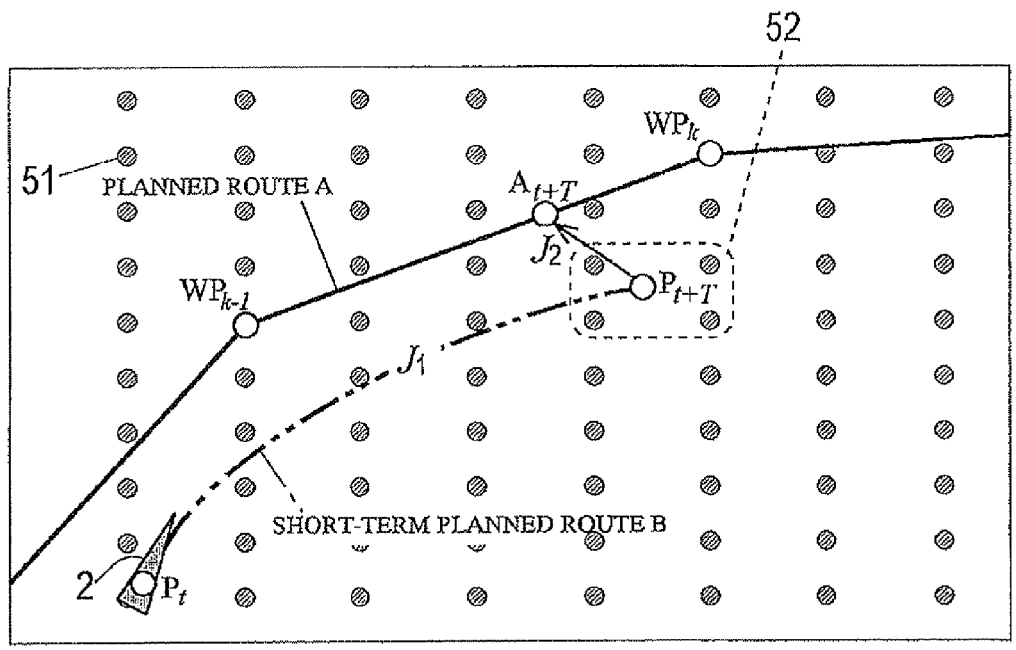
FIG. 7 is a diagram which relates to the method of designing the short-term planned route and explains a method (second method) of calculating the second element of the evaluation function by utilizing ex.3 in Formula 9-3.

Further, as shown in FIG. 7, the second element $J_2$ can be calculated in accordance with ex.3 in Formula 9-3 in a case where the marine area in which the ship 2 sails is divided by the mesh, and the fuel consumption (hereinafter referred to as "remaining evaluation value") from the starting point that is a mesh intersection point (hereinafter referred to as "mesh point 51") up to the destination (the position of the arrival port) is being predicted. The mesh which virtually divides the marine area is set in the same manner as the above-described marine phenomenon time-space map. In this case, the planned position $A_t$ on the planned route A and the remaining evaluation values of a plurality of mesh points 51 in the vicinity of the planned position $A_t$ are transmitted from the planned route designing device 4 to the ship maneuvering device 3. Then, the short-term planned route designing portion 28 of the ship maneuvering device 3 searches the short-term planned route until the time T later (until the time t+T) based on the planned position $A_t$ on the planned route A, the remaining evaluation values of the plurality of mesh points 51 in the vicinity of the planned position $A_t$, and the operation performance and state quantity (ship position, bow direction, ship speed, disturbances, and the like) at the current time t, and evaluates the short-term planned route by the first evaluation index J. In this searching of the short-term planned route, the ship 2 is assumed to be sailing in the vicinity of the planned route A, and a search range of the end position $P_{t+T}$ is limited to a range which is in the vicinity of the planned position $A_t$ and in which the mesh points 51 exist. Then, the searched short-term planned routes are evaluated by using the first evaluation index J, and the route by which the first evaluation index J ($J_1+J_2$) becomes minimum is set as the short-term planned route B. Here, the increase or decrease of the remaining evaluation amount when the planned position $A_{t+T}$ after the time T is changed to the end position $P_{t+T}$ is set to the second element $J_2$ of the first evaluation index J. For example, the second element $J_2$ may be set to a weighted average of the remaining evaluation amounts of four mesh points 51 (mesh points in a range indicated by reference sign 52 in FIG. 7) surrounding the end position $P_{t+T}$ and adjacent to the end position $P_{t+T}$.

It should be noted that each of the weight coefficients $w_x$ and $w_y$ in ex.1 (Formula 9-1), ex.2 (Formula 9-2), and ex.3 (Formula 9-3) is a numerical value which changes in relation to the subsequent sail from the end position $P_{t+T}$. As described above, since the first evaluation index J contains the second element $J_2$ indicating the fluctuation portion, the influence on the subsequent sail by the existence of the ship 2 at not the planned position $A_{t+T}$ but the end position $P_{t+T}$ at the time t+T is considered in the first evaluation index J. As the time t+T gets close to the arrival time $T_f$, the remaining sail distance decreases, and the influence of the displacement of the end position $P_{t+T}$ from the planned position $A_{t+T}$ increases. Here, the weight of each of the weight coefficients $w_x$ and $w_y$ is set to increase in reverse proportion to the remaining sail distance as the time t+T gets close to the arrival time $T_f$ or as the planned position $A_{t+T}$ or the end position $P_{t+T}$ gets close to the destination $X_f$.

As a basic principle, the short-term planned route B by which the first evaluation index J becomes optimal (minimum) as above is a route by which the fuel consumption becomes minimum. In addition to this basic principle, an optimal route generated by also considering the reduction of the hull shaking by the disturbances, such as wave and swell, may be set as the short-term planned route B. In this case, a setting which emphasizes the reduction of the hull shaking is input to the ship maneuvering device 3 by the route information input unit 15. As a specific example, a weight of the reduction of the hull shaking is provided as one calculation parameter of the short-term planned route designing portion 28, an initial value of this weight is zero, and the value of the weight is increased when the reduction of the hull shaking is emphasized. When the weight of the reduction of the hull shaking is larger than zero, the short-term planned route designing portion 28 of the ship maneuvering device 3 predicts the hull shaking caused by wave or swell and searches the short-term planned route, which realizes the reduction of the hull shaking in addition to the reduction of the fuel consumption that is the basic principle, until the time T later from the current time t. Here, the calculations are simplified by assuming that the disturbances, such as wind, tidal current, wave, and swell, are constant until the time T later from the current time t.

Figure 8:
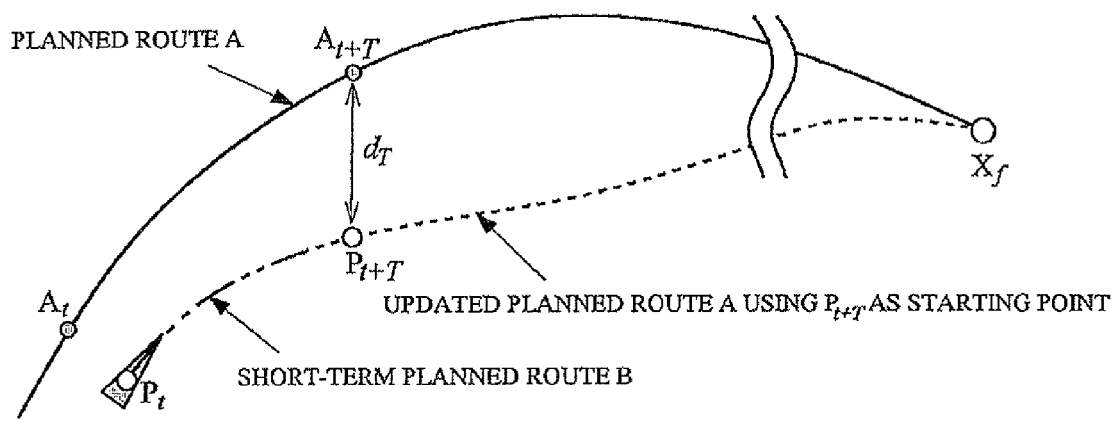
FIG. 8 is a diagram showing a relation between a planned route and the short-term planned route.
Figure 9:
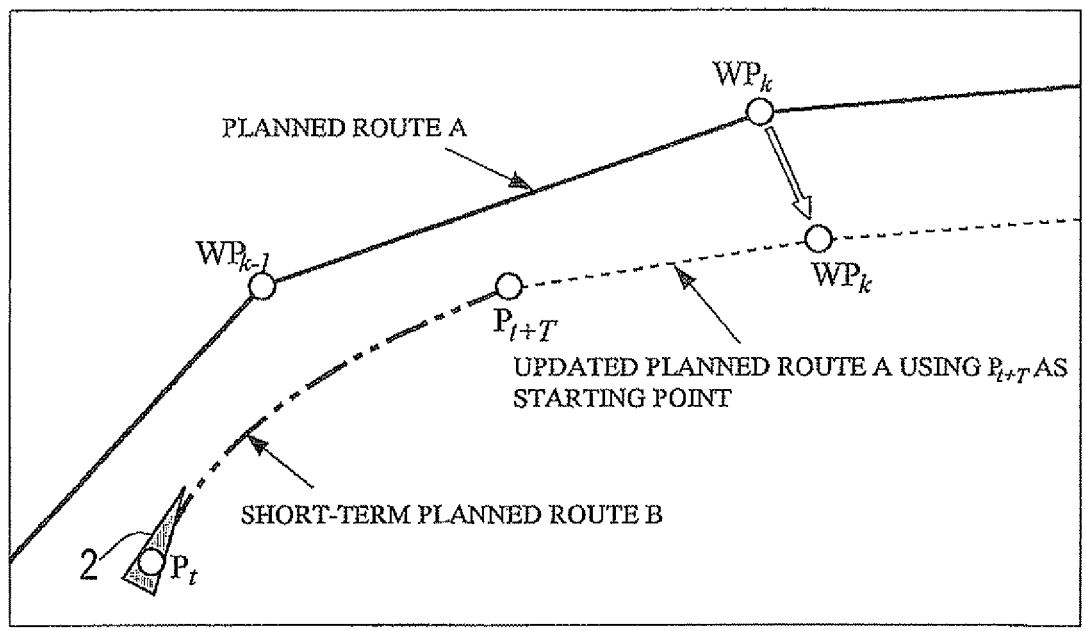
FIG. 9 is a diagram explaining an updated planned route.

The end position $P_{t+T}$ of the short-term planned route B calculated as above is utilized as the predicted ship position when updating the planned route A. To be specific, the route information acquiring unit 19 of the ship maneuvering device 3 periodically transmits a position (predicted ship position), which is a position after an appropriate time from the current position, together with the route calculation execution command to the planned route designing device 4, and the end position $P_{t+T}$ of the short-term planned route B is adopted as this predicted ship position. With this, as shown in FIGS. 8 and 9, the new planned route A from the predicted ship position received by the route information acquiring unit 19 from the planned route designing device 4 becomes an optimal route from the end position $P_{t+T}$ up to the destination $X_f$. Thus, the ship 2 sails while the planned route A is being corrected in accordance with the actual sail. In a case where the ship 2 sails out of the planned route A, and the planned route A is not already optimal, the ship 2 does not have to return to the planned route A, and the loss when returning to the planned route A can be avoided.

Flow of Ship Maneuvering Control

Figure 10:
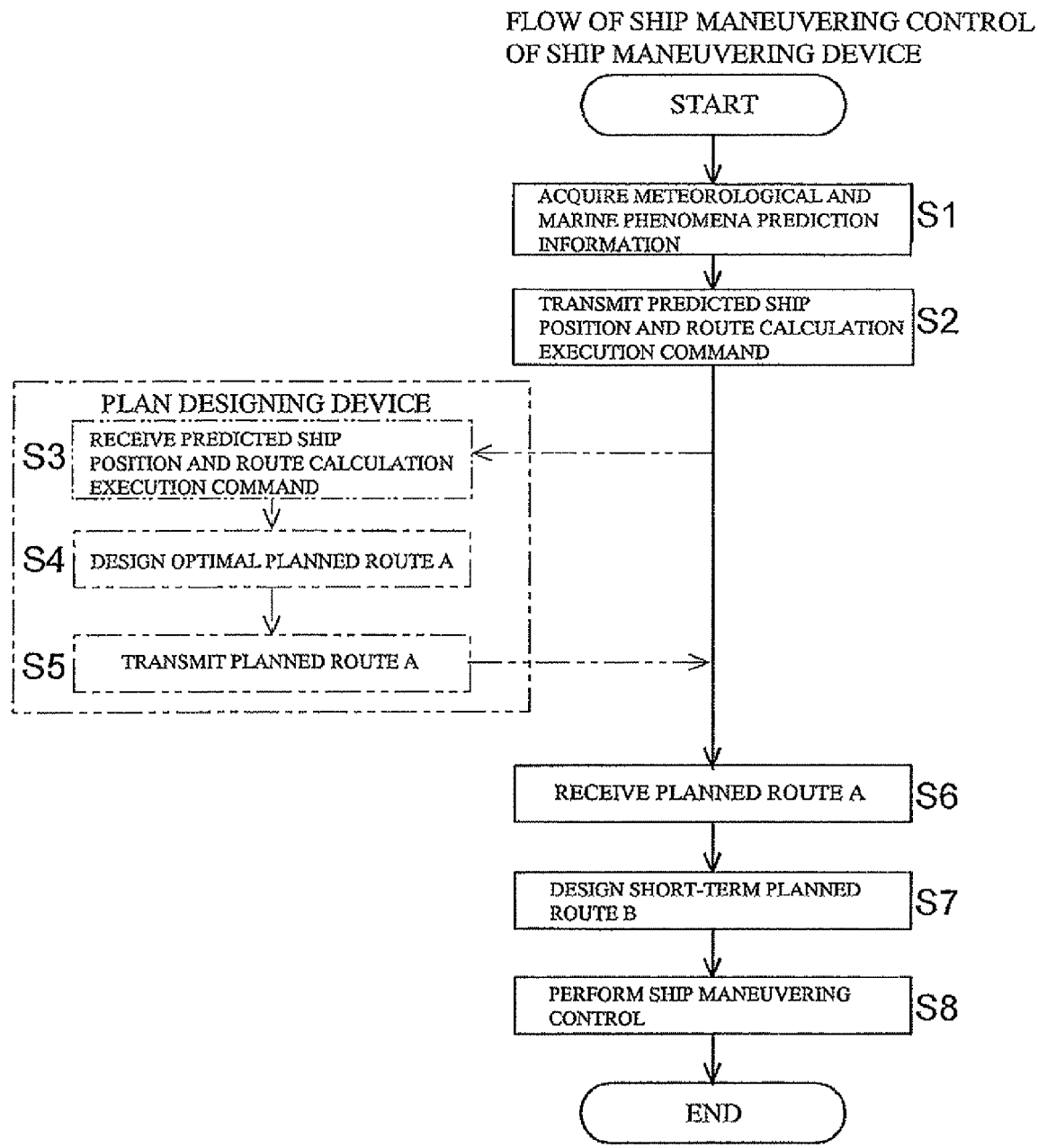
FIG. 10 is a flow chart of ship maneuvering control of the ship maneuvering device.
Figure 11:
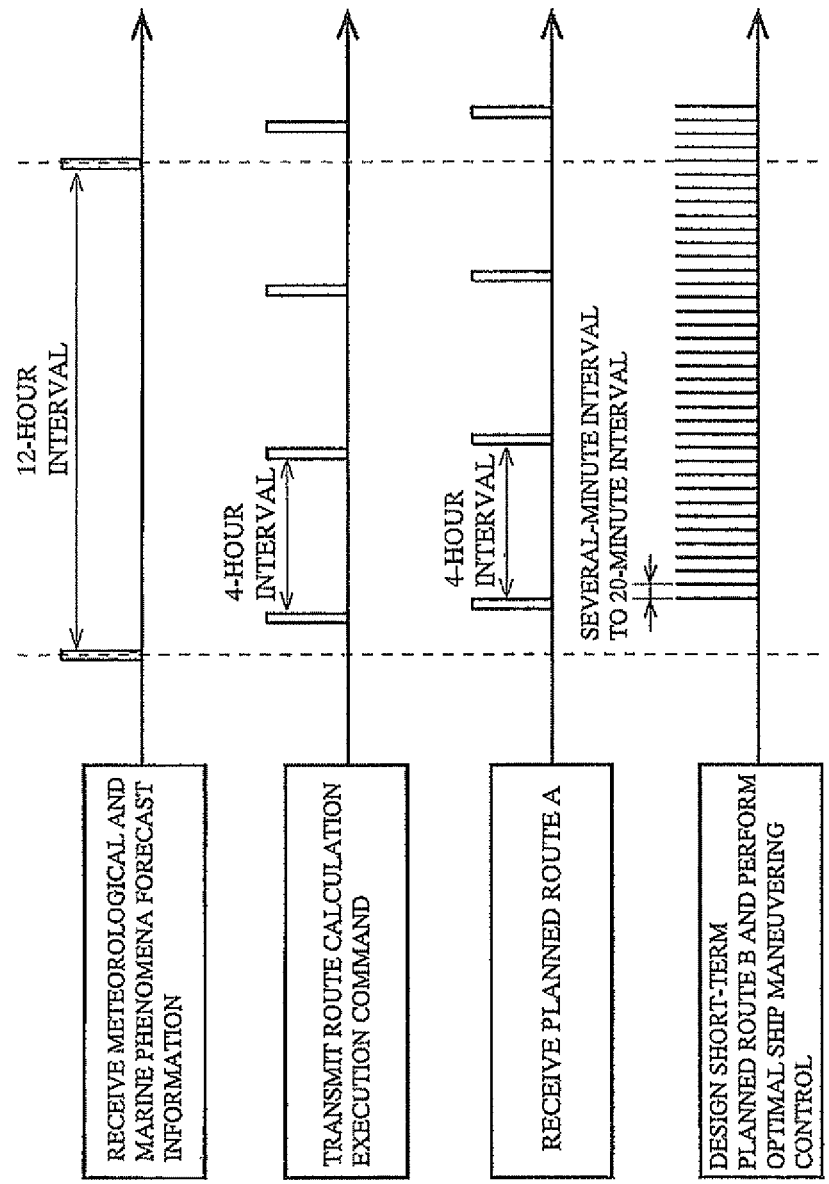
FIG. 11 is a time chart of operations of the ship maneuvering device.

Here, the flow of the ship maneuvering control performed by the ship maneuvering control system 1 will be explained in reference to FIGS. 10 and 11. FIG. 10 is a flow chart of the ship maneuvering control of the ship maneuvering device. FIG. 11 is a time chart of operations of the ship maneuvering device.

First, the meteorological and marine phenomena prediction information utilized in the weather routing is distributed, and the planned route designing device 4 receives this information, stores the information in the meteorological and marine phenomena prediction database, and transmits the information to the ship maneuvering device 3 through the ship-to-land communication system 9 (Step S1). The meteorological and marine phenomena prediction information is distributed at a fixed time at predetermined time intervals, such as at 12-hour (or 24-hour) intervals.

The route information acquiring unit 19 of the ship maneuvering device 3 transmits the predicted ship position of the ship 2 and the route calculation execution command to the planned route designing device 4 through the ship-to-land communication system 9, the predicted ship position being a position after an appropriate time (for example, an hour) from the current time (Step S2). The route calculation execution command is transmitted, for example, at a fixed time corresponding to the time of the distribution of the meteorological and marine phenomena prediction information, at four-hour intervals corresponding to a change cycle of a watch, when a scheduled arrival time or/and the destination (arrival port) is changed, or when a distance between the planned route A and the ship position is larger than a predetermined distance.

The planned route designing device 4 which has received the route calculation execution command (Step S3) designs by the weather routing function based on the actual marine area performance information and the meteorological and marine phenomena prediction information of the sail marine area the optimal planned route A (the optimal route and the optimal ship speed distribution) by which the ship arrives the destination $X_f$ at the scheduled arrival time $T_f$ from the predicted ship position set as the starting point (Step S4). Next, the planned route designing device 4 transmits the newly designed planned route A to the ship maneuvering device 3 through the ship-to-land communication system 9 (Step S5). The route information acquiring unit 19 of the ship maneuvering device 3 which has received the planned route A (Step S6) stores the newly designed planned route A in the planned route database 19a.

In the ship maneuvering device 3 having received the planned route A, the short-term planned route designing portion 28 designs the short-term planned route B (Step S7), and the ship maneuvering portion 29 performs the ship maneuvering control such that the ship sails along the short-term planned route B (Step S8). The short-term planned route B contains a short-term optimal route from the current position and an optimal ship maneuvering condition (ship speed and bow azimuth), which are obtained by calculation based on the estimated encounter marine phenomenon estimated from the actually encountered marine phenomenon by the actually encounter marine phenomenon estimating portion 27 and the planned route A. It is desirable that the designing of the short-term planned route B and the ship maneuvering control be repeatedly performed at comparatively short intervals, such as several-minute intervals to about 20-minute intervals. In this case, the optimal short-term planned route B based on the actually encountered marine phenomenon is calculated in real time on the ship. Therefore, the accurate ship maneuvering control corresponding to the actually encountered marine phenomenon and the hull state, such as the draft, can be performed although it has been difficult to realize by the current weather routing. Thus, not only the reduction of the burden of the ship pilot but also the low fuel consumption and safe sail independent of the skill of the ship pilot can be realized.

The foregoing has explained one preferred embodiment of the present invention, but the present invention is not limited to the above embodiment, and various design changes may be made within claims below.

Figure 14:
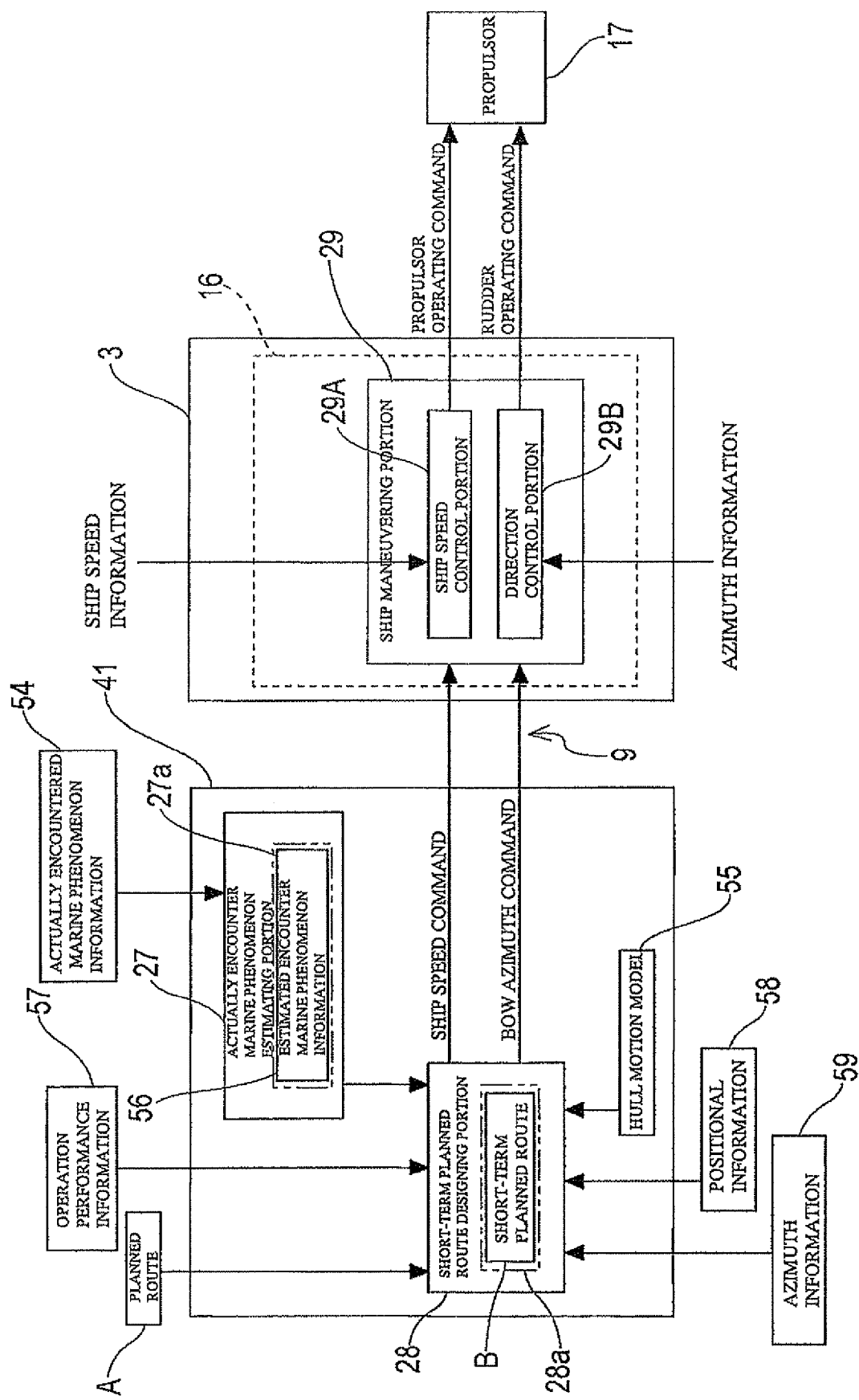
FIG. 14 is a functional block diagram for designing the short-term planned route in a case where a function as a route optimization calculating portion is provided on land.

For example, in the ship maneuvering control system 1 according to the above embodiment, the short-term planned route designing portion 28 configured to design the short-term planned route B is provided in the ship maneuvering device 3 mounted on the ship 2. However, the function as the short-term planned route designing portion 28 configured to calculate the short-term planned route B may be provided on land. In this case, as shown in FIG. 14, a short-term planned route designing device 41 including the functions of the actually encounter marine phenomenon estimating portion 27 and the short-term planned route designing portion 28 is provided on land. The short-term planned route designing device 41 and the planned route designing device 4 are connected to each other through wired or wireless communication means such that information transmission and reception can be performed therebetween. The planned route designing device 4 and the short-term planned route designing device 41 may be configured integrally. The short-term planned route designing device 41 and the ship maneuvering device 3 and monitoring device 5 mounted on the ship 2 are configured such that information transmission and reception can be performed thereamong through the ship-to-land communication system 9. The planned route A, the operation performance information 57, the positional information 58, the azimuth information 59, and the actually encountered marine phenomenon information 54 are transmitted from the planned route designing device 4 to the short-term planned route designing device 41. The operation performance information 57, the positional information 58, the azimuth information 59, and the actually encountered marine phenomenon information 54 are information having been transmitted from the monitoring device 5 on the ship 2 to the planned route designing device 4. The operation performance information 57, the positional information 58, the azimuth information 59, and the actually encountered marine phenomenon information 54 may be transmitted from the monitoring device 5 directly to the short-term planned route designing device 41. The actually encounter marine phenomenon estimating portion 27 of the short-term planned route designing device 41 generates the estimated encounter marine phenomenon information 56 by using the actually encountered marine phenomenon information 54. Then, the short-term planned route designing portion 28 of the short-term planned route designing device 41 designs the short-term planned route B by using the planned route A, the estimated encounter marine phenomenon information 56, the operation performance information 57, the positional information 58, the azimuth information 59, and the hull motion model 55. The designed short-term planned route B contains the ship speed and bow azimuth for sailing this optimal short-term route. The ship speed command and the bow azimuth command are transmitted through the ship-to-land communication system 9 to the ship maneuvering device 3. In the ship maneuvering portion 29 of the ship maneuvering device 3, the ship speed control portion 29A outputs the propulsor operating command to the propulsor 17 based on the ship speed command, and the direction control portion 29B outputs the rudder operating command to the propulsor 17 based on the bow azimuth command. Thus, the ship 2 can sail along the optimal short-term planned route B.

INDUSTRIAL APPLICABILITY

The present invention can be utilized as not only a device configured to perform optimal ship maneuvering but also a device configured to support optimal sail of a ship.

| Reference Signs List | |
|---|---|
| 1 | ship maneuvering control system |
| 2 | ship |
| 3 | ship maneuvering device |
| 4 | planned route designing device |
| 5 | monitoring device |
| 13 | position measuring unit |
| 14 | azimuth measuring unit |
| 15 | route information input unit |
| 16 | controller |
| 17 | propulsor |
| 18 | wave measuring unit |
| 19 | route information acquiring unit |
| 21 | main propulsor |
| 22 | rudder |
| 27 | actually encounter marine phenomenon estimating portion |
| 28 | short-term planned route designing portion (short-term planned route designing unit) |
| 29 | ship maneuvering portion (ship maneuvering unit) |
| 29A | ship speed control portion |
| 29B | direction control portion |

The invention claimed is:

1. A ship maneuvering control method of optimizing a route of a ship, comprising the steps of:
  designing a planned route for sailing from a starting point to a destination based on meteorological marine phenomena prediction information and a performance information for the ship:
  acquiring actually encountered marine phenomenon information and marine phenomenon statistical information by measuring, on the ship, marine phenomena that the ship encounters during sail:

acquiring estimated encounter marine phenomenon information based on the actually encountered marine phenomenon information and the marine phenomenon statistical information, the estimated encounter marine phenomenon information being information from a first time that is a current time until a second time that is a near-future time in a route surrounding marine area;

acquiring operation performance information by measuring, on the ship, an operation performance of the ship during the sail; and designing a short-term planned route using a computer based on the planned route, the estimated encounter marine phenomenon information, the operation performance information, and a hull motion model of the ship, wherein the short-term planned route is a route from a start position that is a ship position at the first time up to an end position that is the ship position at the second time and by which a value of a first evaluation function becomes an optimal value, wherein the first evaluation function contains:
an index indicating an influence of a fluctuation portion between a planned position that is the ship position planned at the second time on the planned route and the end position;
a fuel consumption index when the ship sails along the short-term planned route; and
a safety index when the ship sails along the short-term planned route, and wherein the step of designing the short-term planned comprises:
setting a target route passing through the start position and the planned position is set; and
searching the short-term planned route on the basis that an end time is fixed and an end state quantity is free on the target route.

2. A ship maneuvering control method of optimizing route of a ship, comprising the steps of:
designing a planned route for sailing from a starting point to a destination based on meteorological marine phenomena prediction information and a performance information for the ship:

acquiring actually encountered marine phenomenon information and marine phenomenon statistical information by measuring, on the ship, marine phenomena that the ship encounters during sail:

acquiring estimated encounter marine phenomenon information based on the actually encountered marine phenomenon information and the marine phenomenon statistical information, the estimated encounter marine phenomenon information being information from a first time that is a current time until a second time that is a near-future time in a route surrounding marine area;

acquiring operation performance information by measuring, on the ship, an operation performance of the ship during the sail; and designing a short-term planned route using a computer based on the planned route, the estimated encounter marine phenomenon information, the operation performance information, and a hull motion model of the ship, wherein the short-term planned route is a route from a start position that is a ship position at the first time up to an end position that is the ship position at the second time and by which a value of a first evaluation function becomes an optimal value, wherein the first evaluation function contains:
an index indicating an influence of a fluctuation portion between a planned position that is the ship position planned at the second time on the planned route and the end position;
a fuel consumption index when the ship sails along the short-term planned route; and
a safety index when the ship sails along the short-term planned route, wherein the planned route is designed such that a second evaluation function becomes optimal; and wherein the index contained in the first evaluation function and indicating the influence of the fluctuation portion between the planned position and the end position indicates a fluctuation portion from the second evaluation function.

3. A ship maneuvering control method of optimizing a route of a ship, comprising the steps of:
designing a planned route for sailing from a starting point to a destination based on meteorological marine phenomena prediction information and a performance information for the ship:

acquiring actually encountered marine phenomenon information and marine phenomenon statistical information by measuring, on the ship, marine phenomena that the ship encounters during sail:

acquiring estimated encounter marine phenomenon information based on the actually encountered marine phenomenon information and the marine phenomenon statistical information, the estimated encounter marine phenomenon information being information from a first time that is a current time until a second time that is a near-future time in a route surrounding marine area;

acquiring operation performance information by measuring, on the ship, an operation performance of the ship during the sail; and designing a short-term planned route using a computer based on the planned route, the estimated encounter marine phenomenon information, the operation performance information, and a hull motion model of the ship, wherein the short-term planned route is a route from a start position that is a ship position at the first time up to an end position that is the ship position at the second time and by which a value of a first evaluation function becomes an optimal value, wherein the first evaluation function contains:
an index indicating an influence of a fluctuation portion between a planned position that is the ship position planned at the second time on the planned route and the end position;
a fuel consumption index when the ship sails along the short-term planned route; and
a safety index when the ship sails along the short-term planned route, and wherein the index contained in the first evaluation function and indicating the influence of the fluctuation portion between the planned position and the end position indicates a deviation between the planned position and the end position.

4. A ship maneuvering control method of optimizing a route of a ship, comprising the steps of:
designing a planned route for sailing from a starting point to a destination based on meteorological marine phenomena prediction information and a performance information for the ship:

acquiring actually encountered marine phenomenon information and marine phenomenon statistical information by measuring, on the ship, marine phenomena that the ship encounters during sail:

acquiring estimated encounter marine phenomenon information based on the actually encountered marine phenomenon information and the marine phenomenon statistical information, the estimated encounter marine phenomenon information being information from a first time that is a current time until a second time that is a near-future time in a route surrounding marine area;

acquiring operation performance information by measuring, on the ship, an operation performance of the ship during the sail; and designing a short-term planned route using a computer based on the planned route, the estimated encounter marine phenomenon information, the operation performance information, and a hull motion model of the ship, wherein the short-term planned route is a route from a start position that is a ship position at the first time up to an end position that is the ship position at the second time and by which a value of a first evaluation function becomes an optimal value, wherein the first evaluation function contains:
    an index indicating an influence of a fluctuation portion between a planned position that is the ship position planned at the second time on the planned route and the end position;
    a fuel consumption index when the ship sails along the short-term planned route; and
    a safety index when the ship sails along the short-term planned route, and wherein the index contained in the first evaluation function and indicating the influence of the fluctuation portion between the planned position and the end position contains a first function and a second function, the first function being a function of a component of a deviation between the planned position and the end position in a proceeding direction of the planned route, the second function being a function of a component of the deviation in a direction perpendicular to the proceeding direction of the planned route.

5. The ship maneuvering control method according to claim 4, wherein weight coefficients are respectively given to the first function and the second function, and each of these weight coefficients is a function which changes in relation to a sail distance from the end position to the destination.

6. A ship maneuvering control system comprising:
a computer usable medium having a planned route designed based on meteorological and marine phenomena prediction information and performance information of a ship such that the ship sails from a starting point up to a destination;
a computer usable medium having estimated encounter marine phenomenon information which is information from a first time during the sail until a second time that is a near-future time in a route surrounding marine area and is estimated based on marine phenomenon statistical information of a marine area in which the ship sails and marine phenomenon information that the ship has actually encountered;
a computer usable medium having operation performance information of the ship, the operation performance information being measured until the first time during the sail;
a computer usable medium having a hull motion model of the ship;
a computer with a short-term planned route designing unit configured to design a short-term planned route based on the planned route, the estimated encounter marine phenomenon information, the operation performance information, and the hull motion model, and
a computer with a ship maneuvering unit configured to maneuver the ship,
wherein the short-term planned route is a route from a start position that is a ship position at the first time up to an end position that is the ship position at the second time and by which a value of a first evaluation function becomes an optimal value,
wherein the first evaluation function contains: an index indicating an influence of a fluctuation portion between a planned position that is the ship position planned at the second time on the planned route and the end position; a fuel consumption index when the ship sails along the short-term planned route; and a safety index when the ship sails along the short-term planned route, and
wherein the short-term planned route designing unit is configured to:
    calculate a ship maneuvering condition used by the ship maneuvering unit to sail along the short-term planned route; and
    supply the ship maneuvering condition to the ship maneuvering unit.

7. A ship maneuvering control system comprising:
a computer usable medium having a planned route designed based on meteorological and marine phenomena prediction information and performance information of a ship such that the ship sails from a starting point up to a destination;
a computer usable medium having estimated encounter marine phenomenon information which is information from a first time during the sail until a second time that is a near-future time in a route surrounding marine area and is estimated based on marine phenomenon statistical information of a marine area in which the ship sails and marine phenomenon information that the ship has actually encountered;
a computer usable medium having operation performance information of the ship, the operation performance information being measured until the first time during the sail;
a computer usable medium having a hull motion model of the ship;
a computer with a short-term planned route designing unit configured to design a short-term planned route based on the planned route, the estimated encounter marine phenomenon information, the operation performance information, and the hull motion model, and
a computer with a planned route designing unit configured to supply the planned route to the short-term planned route designing unit,
wherein the short-term planned route is a route from a start position that is a ship position at the first time up to an end position that is the ship position at the second time and by which a value of a first evaluation function becomes an optimal value,
wherein the first evaluation function contains:
    an index indicating an influence of a fluctuation portion between a planned position that is the ship position planned at the second time on the planned route and the end position;
    a fuel consumption index when the ship sails along the short-term planned route; and
    a safety index when the ship sails along the short-term planned route, and wherein the planned route designing unit is configured to:
  design a new planned route from a starting point that is the end position of the short-term planned route up to the destination; and
  supply the new planned route to the short-term planned route designing unit.

8. A ship maneuvering control system comprising:
  a computer usable medium having a planned route designed based on, meteorological and marine phenomena prediction information and performance information of a ship such that the ship sails from a starting point up to a destination;
  a computer usable medium having estimated encounter marine phenomenon information which is information from a first time during the sail until a second time that is a near-future time in a route surrounding marine area and is estimated based on marine phenomenon statistical information of a marine area in which the ship sails and marine phenomenon information that the ship has actually encountered;
  a computer usable medium having operation performance information of the ship, the operation performance information being measured until the first time during the sail;
  a computer usable medium having a hull motion model of the ship; and
  a computer with a short-term planned route, designing unit configured to design a short-term planned route based on the planned route, the estimated encounter marine phenomenon information, the operation performance information, and the hull motion model,
  wherein the short-term planned route is a route from a start position that is a ship position at the first time up to an end position that is the ship position at the second time and by which a value of a first evaluation function becomes an optimal value,
  wherein the first evaluation function contains:
    an index indicating an influence of a fluctuation portion between a planned position that is the ship position planned at the second time on the planned route and the end position;
    a fuel consumption index when the ship sails along the short-term planned route; and
    a safety index when the ship sails along the short-term planned route, and wherein the short-term planned route designing unit sets a target route passing through the start position and the planned position and searches the short-term planned route, which is a route from the first time until the second time, on the basis that an end time is fixed and an end state quantity is free on the target route.

9. A ship maneuvering control system comprising:
  a computer usable medium having a planned route designed based on meteorological and marine phenomena prediction information and performance information of a ship such that the ship sails from a starting point up to a destination;
  a computer usable medium having estimated encounter marine phenomenon information which is information from a first time during the sail until a second time that is a near-future time in a route surrounding marine area and is estimated based on marine phenomenon statistical information of a marine area in which the ship sails and marine phenomenon information that the ship has actually encountered;
  a computer usable medium having operation performance information of the ship, the operation performance information being measured until the first time during the sail;
  a computer usable medium having a hull motion model of the ship; and
  a computer with a short-term planned route designing unit configured to design a short-term planned route based on the planned route, the estimated encounter marine phenomenon information, the operation performance information, and the hull motion model,
  wherein the short-term planned route is a route from a start position that is a ship position at the first time up to an end position that is the ship position at the second time and by which a value of a first evaluation function becomes an optimal,
  wherein the first evaluation function contains:
    an index indicating an influence of a fluctuation portion between a planned position that is the ship position planned at the second time on the planned route and the end position;
    a fuel consumption index when the ship sails along the short-term planned route; and
    a safety index when the ship sails along the short-term planned route,
  wherein the planned route is designed such that a value of a second evaluation function becomes an optimal value; and
  wherein the index contained in the first evaluation function and indicating the influence of the fluctuation portion between the planned position and the end position indicates a fluctuation portion from the second evaluation function.

10. A ship maneuvering control system comprising:
  a computer usable medium having a planned route designed based on meteorological and marine phenomena prediction information and performance information of a ship such that the ship sails from a starting point up to a destination;
  a computer usable medium having estimated encounter marine phenomenon information which is information from a first time during the sail until a second time that is a near-future time in a route surrounding marine area and is estimated based on marine phenomenon statistical information of a marine area in which the ship sails and marine phenomenon information that the ship has actually encountered;
  a computer usable medium having operation performance information of the ship, the operation performance information being measured until the first time during the sail;
  a computer usable medium having a hull motion model of the ship; and
  a computer with a short-term planned route designing unit configured to design a short-term planned route based on the planned route, the estimated encounter marine phenomenon information, the operation performance information, and the hull motion model,
  wherein the short-term planned route is a route from a start position that is a ship position at the first time up to an end position that is the ship position at the second time and by which a value of a first evaluation function becomes an optimal value, wherein the first evaluation function contains:
an index indicating an influence of a fluctuation portion between a planned position that is the ship position planned at the second time on the planned route and the end position;
a fuel consumption index when the ship sails along the short-term planned route; and
a safety index when the ship sails along the short-term planned route, and
wherein the index contained in the first evaluation function and indicating the influence of the fluctuation portion between the planned position and the end position indicates a deviation between the planned position and the end position.

11. A ship maneuvering control system comprising:
a computer usable medium having a planned route designed based on meteorological and marine phenomena prediction information and performance information of a ship such that the ship sails from a starting point up to a destination;
a computer usable medium having estimated encounter marine phenomenon information which is information from a first time during the sail until a second time that is a near-future time in a route surrounding marine area and is estimated based on marine phenomenon statistical information of a marine area in which the shi sails and marine phenomenon information that the ship has actually encountered;
a computer usable medium having operation performance information of the ship, the operation performance information being measured until the first time during the sail;
a computer usable medium having a hull motion model of the ship; and
a computer with a short-term planned route designing unit configured to design a short-term planned route based on the planned route, the estimated encounter marine phenomenon information, the operation performance information, and the hull motion model,
wherein the short-term planned route is a route from a start position that is a ship position at the first time up to an end position that is the ship position at the second time and by which a value of a first evaluation function becomes an optimal value,
wherein the first evaluation function contains:
an index indicating an influence of a fluctuation portion between a planned position that is the ship position planned at the second time on the planned route and the end position;
a fuel consumption index when the ship sails along the short-term planned route; and
a safety index when the ship sails along the short-term planned route, and
wherein the index contained in the first evaluation function and indicating the fluctuation portion of a deviation between the planned position and the end position contains a first function and a second function, the first function being a function of a component of the deviation between the planned position and the end position in a proceeding direction of the planned route, the second function being a function of a component of the deviation in a direction perpendicular to the proceeding direction of the planned route.

12. The ship maneuvering control system according to claim 11, wherein weight coefficients are respectively given to the first function and the second function, and each of these weight coefficients is a function which changes in relation to a sail distance from the end position up to the destination.

* * * * *